United States Patent
Raghavan et al.

(10) Patent No.: US 12,047,788 B2
(45) Date of Patent: Jul. 23, 2024

(54) TRANSFER/FEDERATED LEARNING APPROACHES TO MITIGATE BLOCKAGE IN MILLIMETER WAVE SYSTEMS

(71) Applicant: QUALCOMM Incorporated, San Diego, CA (US)

(72) Inventors: Vasanthan Raghavan, West Windsor Township, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 17/393,215

(22) Filed: Aug. 3, 2021

(65) Prior Publication Data

US 2023/0039254 A1    Feb. 9, 2023

(51) Int. Cl.
*H04W 16/28* (2009.01)
*G06N 20/20* (2019.01)
*H04B 7/06* (2006.01)

(52) U.S. Cl.
CPC .......... *H04W 16/28* (2013.01); *G06N 20/20* (2019.01); *H04B 7/0617* (2013.01)

(58) Field of Classification Search
CPC ......... H04W 16/28; G06N 20/20; G06N 3/00; H04B 7/0617; H04B 7/0404; H04B 7/0691; H04B 7/0695; H04B 7/088
See application file for complete search history.

(56) References Cited

U.S. PATENT DOCUMENTS

| | | | | |
|---|---|---|---|---|
| 10,666,342 | B1* | 5/2020 | Landis | H04B 17/318 |
| 2017/0181132 | A1* | 6/2017 | Xiao | H04B 7/0639 |
| 2017/0359106 | A1* | 12/2017 | John Wilson | H04B 7/0617 |
| 2019/0020402 | A1* | 1/2019 | Gharavi | H04B 17/318 |
| 2019/0116605 | A1* | 4/2019 | Luo | H04W 72/0446 |
| 2019/0253117 | A1* | 8/2019 | Raghavan | H04B 7/0623 |
| 2019/0356177 | A1* | 11/2019 | Swan | H02J 50/80 |
| 2020/0259545 | A1* | 8/2020 | Bai | H04B 7/0626 |
| 2021/0119901 | A1* | 4/2021 | Balakrishnan | H04L 45/08 |
| 2021/0125077 | A1* | 4/2021 | Fidler | G06N 3/08 |

(Continued)

OTHER PUBLICATIONS

Grip-Aware Analog mmWave Beam Codebook Adaptation for 5G Mobile Handsets (Year: 2019).*

(Continued)

*Primary Examiner* — Tejis Daya
(74) *Attorney, Agent, or Firm* — Sevan Savsa; Procopio, Cory, Hargreaves & Savitch LLP

(57) ABSTRACT

A UE may train a NN, based on a blockage of a beam transmission, to indicate one or more beam weights in association with the blockage of the beam transmission. The UE may store, in an ML database, information indicative of at least one of the trained NN or the one or more beam weights indicated via the trained NN, such that the UE may communicate, to an ML server, the information via the trained NN. The ML server may train the NN, based on a TL/FL procedure for the one or more beam weights associated with the at least one blockage, to indicate one or more TL/FL beam weights in association with the at least one blockage, and communicate, to at least one UE, information indicative of at least one of the trained NN or the one or more TL/FL beam weights indicated via the trained NN.

30 Claims, 16 Drawing Sheets

(56) References Cited

U.S. PATENT DOCUMENTS

| | | | |
|---|---|---|---|
| 2021/0185515 A1* | 6/2021 | Bao | H04W 72/51 |
| 2022/0312347 A1* | 9/2022 | Cherian | H04B 17/318 |
| 2023/0028143 A1* | 1/2023 | Raghavan | H04W 48/14 |

OTHER PUBLICATIONS

Spatio-Temporal Impact of Hand and Body Blockage for Millimeter-Wave User Equipment Design at 28 GHz, Dec. 2018, IEEE (Year: 2018).*

* cited by examiner

US 12,047,788 B2

TRANSFER/FEDERATED LEARNING APPROACHES TO MITIGATE BLOCKAGE IN MILLIMETER WAVE SYSTEMS

TECHNICAL FIELD

The present disclosure relates generally to communication systems, and more particularly, to transfer learning (TL) and federated learning (FL) techniques for mitigating hand and/or other body part blockages in millimeter wave (mmW) communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communication (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may train a neural network, based on a blockage of a beam transmission, to indicate one or more beam weights in association with the blockage of the beam transmission; store, in a machine learning (ML) database, information indicative of at least one of the trained neural network or the one or more beam weights indicated via the trained neural network; and communicate, to an ML server, the information indicative of the at least one of the trained neural network or the one or more beam weights indicated via the trained neural network.

In a further aspect of the disclosure, a method, a computer-readable medium, and an apparatus are provided. The apparatus may receive, from at least one user equipment (UE), information indicative of one or more beam weights associated with at least one blockage of a beam transmission from the at least one UE; train a neural network, based on at least one of a transfer learning (TL) procedure or a federated learning (FL) procedure for the one or more beam weights associated with the at least one blockage, to indicate one or more TL/FL beam weights in association with the at least one blockage; and communicate, to the at least one UE, information indicative of at least one of the trained neural network or the one or more TL/FL beam weights indicated via the trained neural network.

In yet a further aspect of the disclosure, a method, a computer-readable medium, and an apparatus are provided. The apparatus may receive, from an ML server, information indicative of at least one of a trained neural network or one or more TL/FL beam weights indicative of the trained neural network; and generate a signal based on the information indicative of the at least one of the trained neural network or the one or more TL/FL beam weights, the signal including the one or more TL/FL beam weights.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
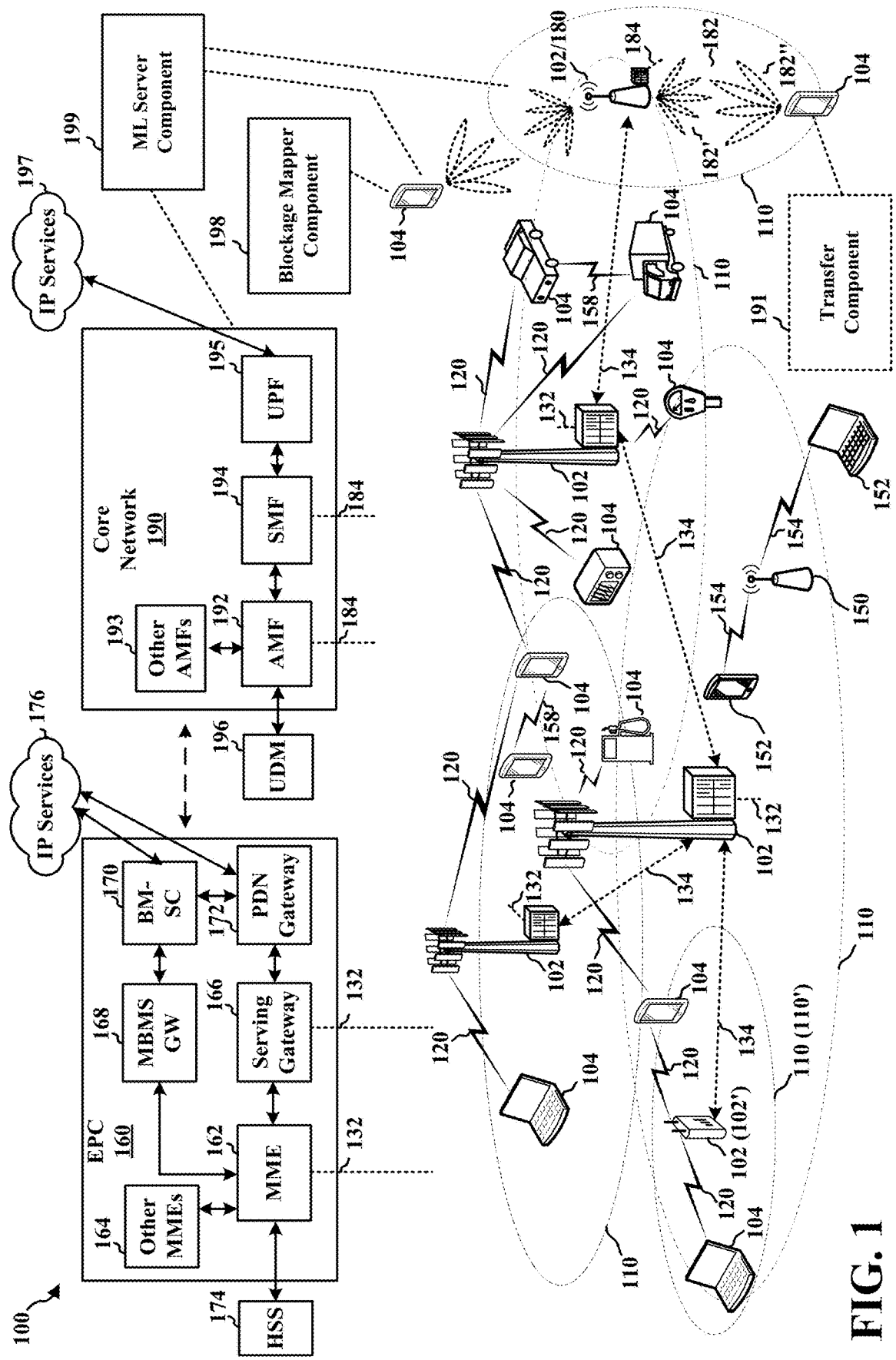
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a blockage mapper component 198 configured to train a neural network, based on a blockage of a beam transmission, to indicate one or more beam weights in association with the blockage of the beam transmission; store, in a machine learning (ML) database, information indicative of at least one of the trained neural network or the one or more beam weights indicated via the trained neural network; and communicate, to an ML server, the information indicative of the at least one of the trained neural network or the one or more beam weights indicated via the trained neural network. The UE 104 may also include a transfer component 191 configured to receive, from an ML server, information indicative of at least one of a trained neural network or one or more transfer learning (TL)/federated learning (FL) beam weights indicative of the trained neural network; and generate a signal based on the information indicative of the at least one of the trained neural network or the one or more TL/FL beam weights, the signal including the one or more TL/FL beam weights. In certain aspects, the base station 180, the core network 190, and/or the UE 104 may include an ML server component 199 configured to receive, from at least one UE, information indicative of one or more beam weights associated with at least one blockage of a beam transmission from the at least one UE; train a neural network, based on at least one of a TL procedure or a FL procedure for the one or more beam weights associated with the at least one blockage, to indicate one or more TL/FL beam weights in association with the at least one blockage; and communicate, to the at least one UE, information indicative of at least one of the trained neural network or the one or more TL/FL beam weights indicated via the trained neural network. Although the following description may be focused on 5G NR, the concepts described herein may be applicable to other similar areas, such as LTE, LTE-A, CDMA, GSM, and other wireless technologies.

Figure 2:
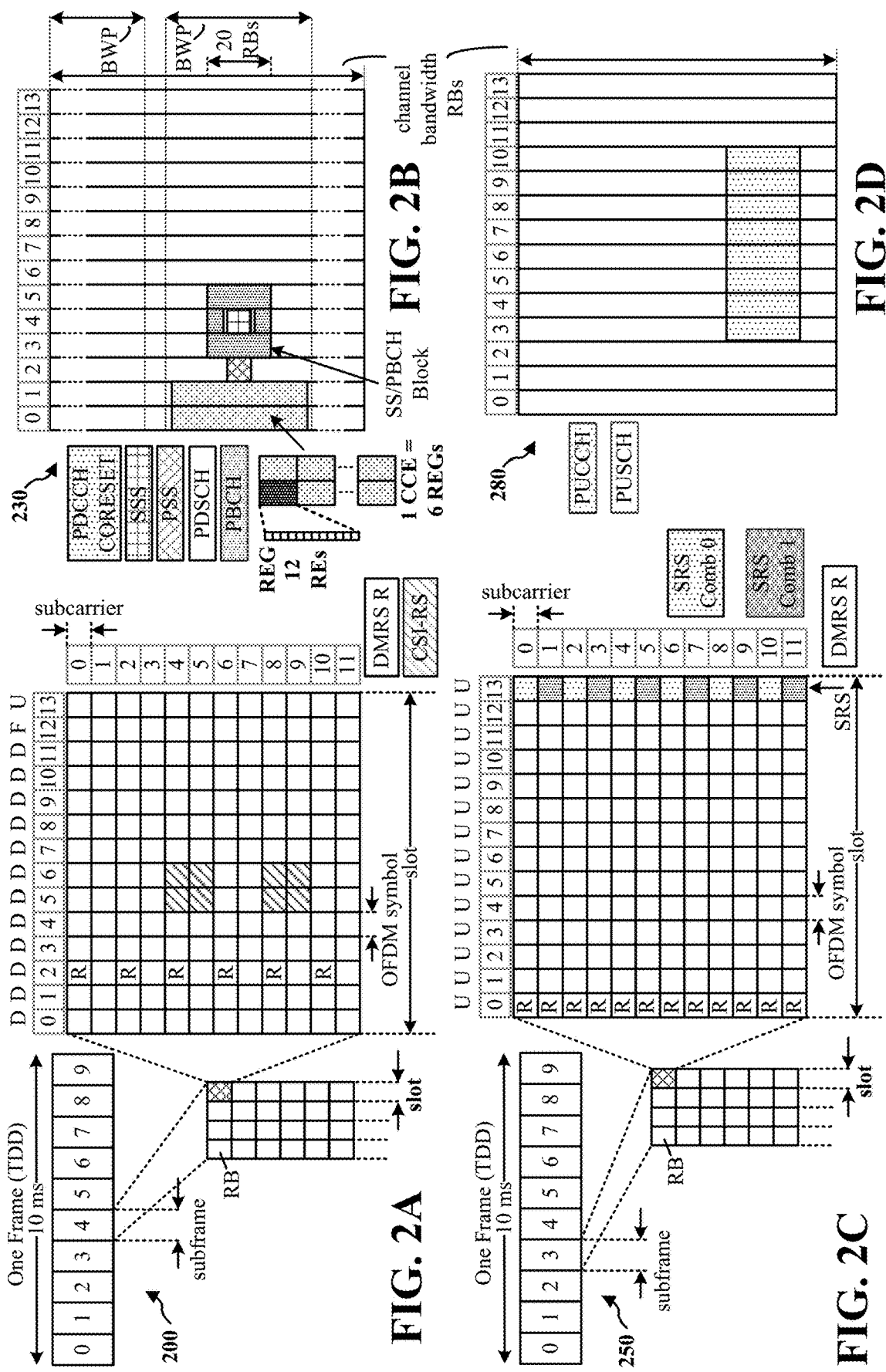
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
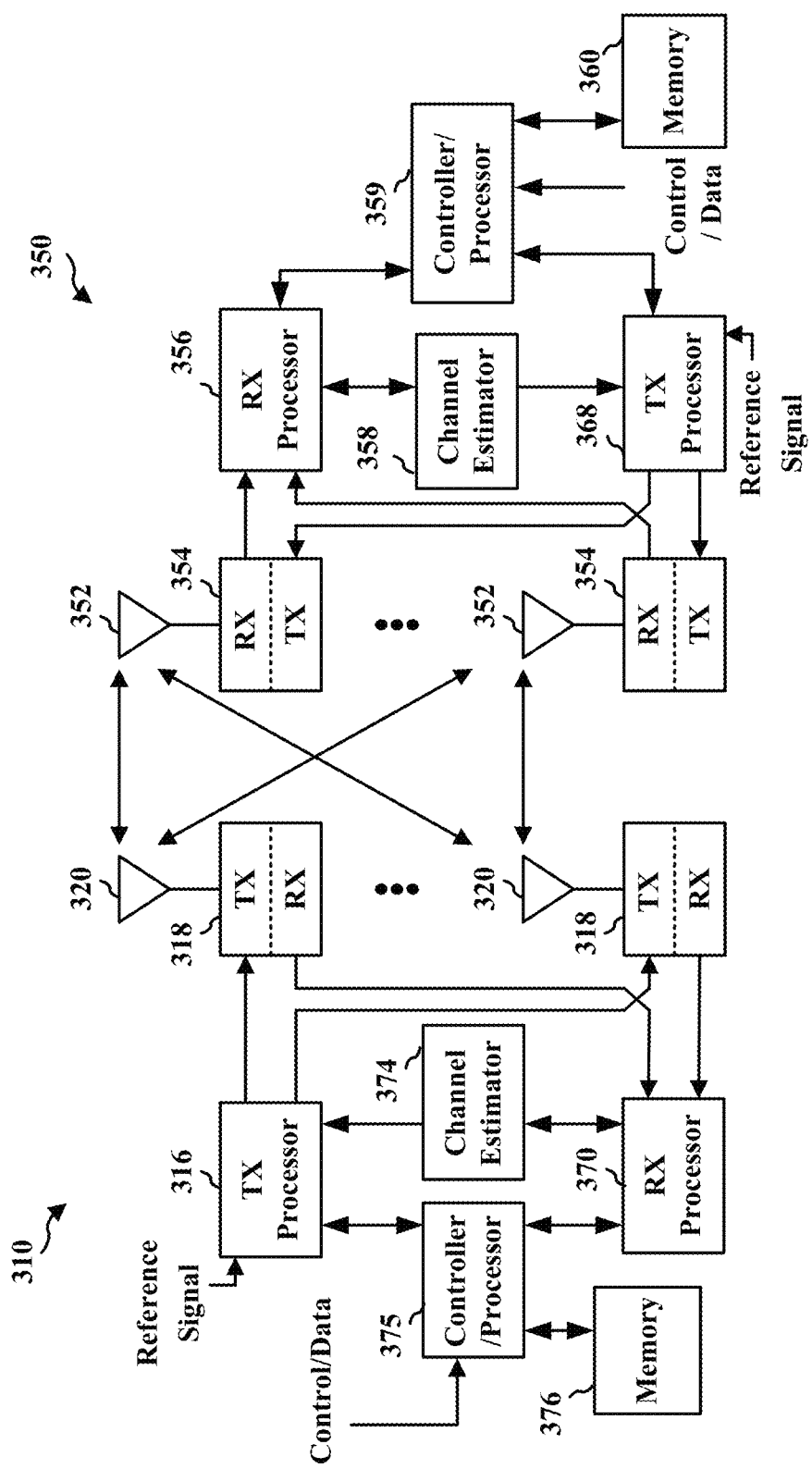
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the blockage mapper component 198, the ML server component 199, and/or the transfer component 191 of FIG. 1.

At least one of the TX processor 316, the RX processor 370, and the controller/processor 375 may be configured to perform aspects in connection with the ML server component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
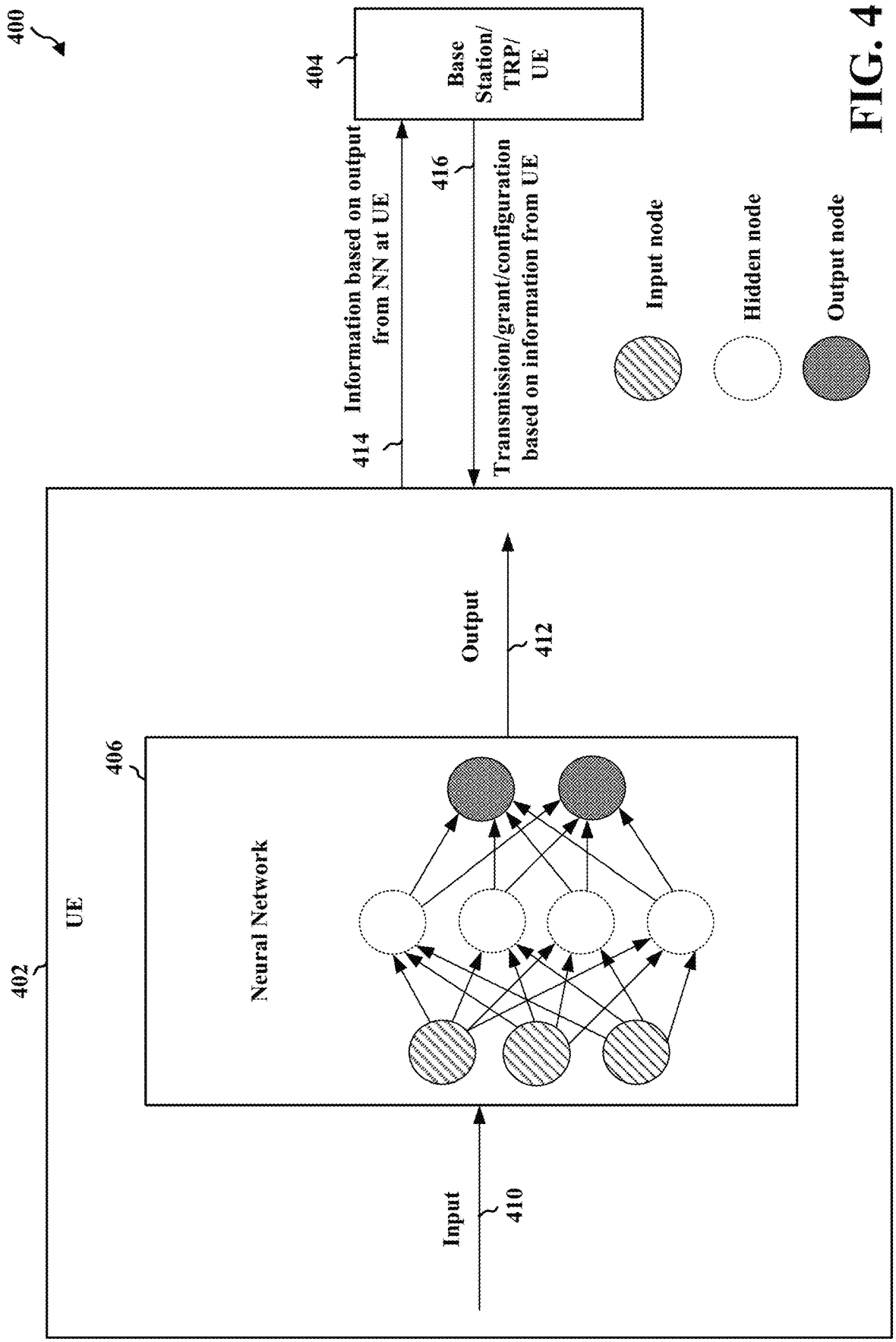
FIG. 4 illustrates a diagram of a UE that includes a neural network configured for determining communications with a second device.

FIG. 4 illustrates a diagram 400 of a UE 402 that includes a neural network 406 configured for determining communications with a second device 404. A UE and/or a base station (e.g., CU and/or DU) may use machine-learning algorithms, deep-learning algorithms, neural networks, reinforcement learning, regression, boosting, or advanced signal processing methods for aspects of wireless communication, e.g., with a base station, a TRP, another UE, etc. Reinforcement learning is a type of machine learning that involves the concept of taking actions in an environment in order to maximize a reward. Reinforcement learning is a machine learning paradigm; other paradigms include supervised learning and unsupervised learning. Basic reinforcement may be modeled as a Markov decision process (MDP) having a set of environment and agent states, and a set of actions of the agent. The process may include a probability of a state transition based on an action and a representation of a reward after the transition. The agent's action selection may be modeled as a policy. The reinforcement learning may enable the agent to learn an optimal, or nearly-optimal, policy that maximizes a reward. Supervised learning may include learning a function that maps an input to an output based on example input-output pairs, which may be inferred from a set of training data, which may be referred to as training examples. The supervised learning algorithm analyzes the training data and provides an algorithm to map to new examples.

Regression analysis may include statistical processes for estimating the relationships between a dependent variable (e.g., which may be referred to as an outcome variable) and independent variable(s). Linear regression is one example of regression analysis. Non-linear models may also be used. Regression analysis may include inferring causal relationships between variables in a dataset.

Boosting includes one or more algorithms for reducing bias and/or variance in supervised learning, such as machine learning algorithms that convert weak learners (e.g., a classifier that is slightly correlated with a true classification) to strong ones (e.g., a classifier that is more closely correlated with the true classification). Boosting may include iterative learning based on weak classifiers with respect to a distribution that is added to a strong classifier. The weak learners may be weighted related to accuracy. The data weights may be readjusted through the process. In some aspects described herein, an encoding device (e.g., a UE) may train one or more neural networks to learn dependence of measured qualities on individual parameters.

The second device 404 may be a base station in some examples. The second device 404 may be a TRP in some examples. The second device 404 may be another UE in some examples, e.g., if the communication between the UE 402 and the second device 404 is based on sidelink. Although example aspects of machine learning and a neural network are provided for an example of a UE, the aspects may similarly be applied by a base station, an IAB node, or another training host.

Among others, examples of machine learning models or neural networks that may be included in the UE 402 include artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; bayesian networks; genetic algorithms; Deep convolutional networks (DCNs) configured with additional pooling and normalization layers; and Deep belief networks (DBNs).

A machine learning model, such as an artificial neural network (ANN), may include an interconnected group of artificial neurons (e.g., neuron models), and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide non-linear statistical data model or decision making and may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivated, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution A×B operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model or neural network may be trained. For example, a machine learning model may be trained based on supervised learning. During training, the machine learning model may be presented with an input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine learning models may include computational complexity and substantial processor for training the machine learning model. FIG. 4 illustrates that an example neural network 406 may include a network of interconnected nodes. An output of one node is connected as the input to another node. Connections between nodes may be referred to as edges, and weights may be applied to the connections/edges to adjust the output from one node that is applied as the input to another node. Nodes may apply thresholds in order to determine whether, or when, to provide output to a connected node. The output of each node may be calculated as a non-linear function of a sum of the inputs to the node. The neural network 406 may include any number of nodes and any type of connections between nodes. The neural network 406 may include one or more hidden nodes. Nodes may be aggregated into layers, and different layers of the neural network may perform different kinds of transformations on the input. A signal may travel from input at a first layer through the multiple layers of the neural network to output at a last layer of the neural network and may traverse layers multiple times. As an example, the UE may input information 410 to the neural network 406, and may receive output 412. The UE may report information 414 to the second device 404 based on the output 412. In some aspects, the second device may transmit communication to the UE 402 based on the information 414. In some aspects, the second device 404 may be a base station that schedules or configures the UE 402 based on the information 414, e.g., at 416. In other aspects, the base station may collect information from multiple training hosts, e.g., from multiple UEs.

Figure 5:
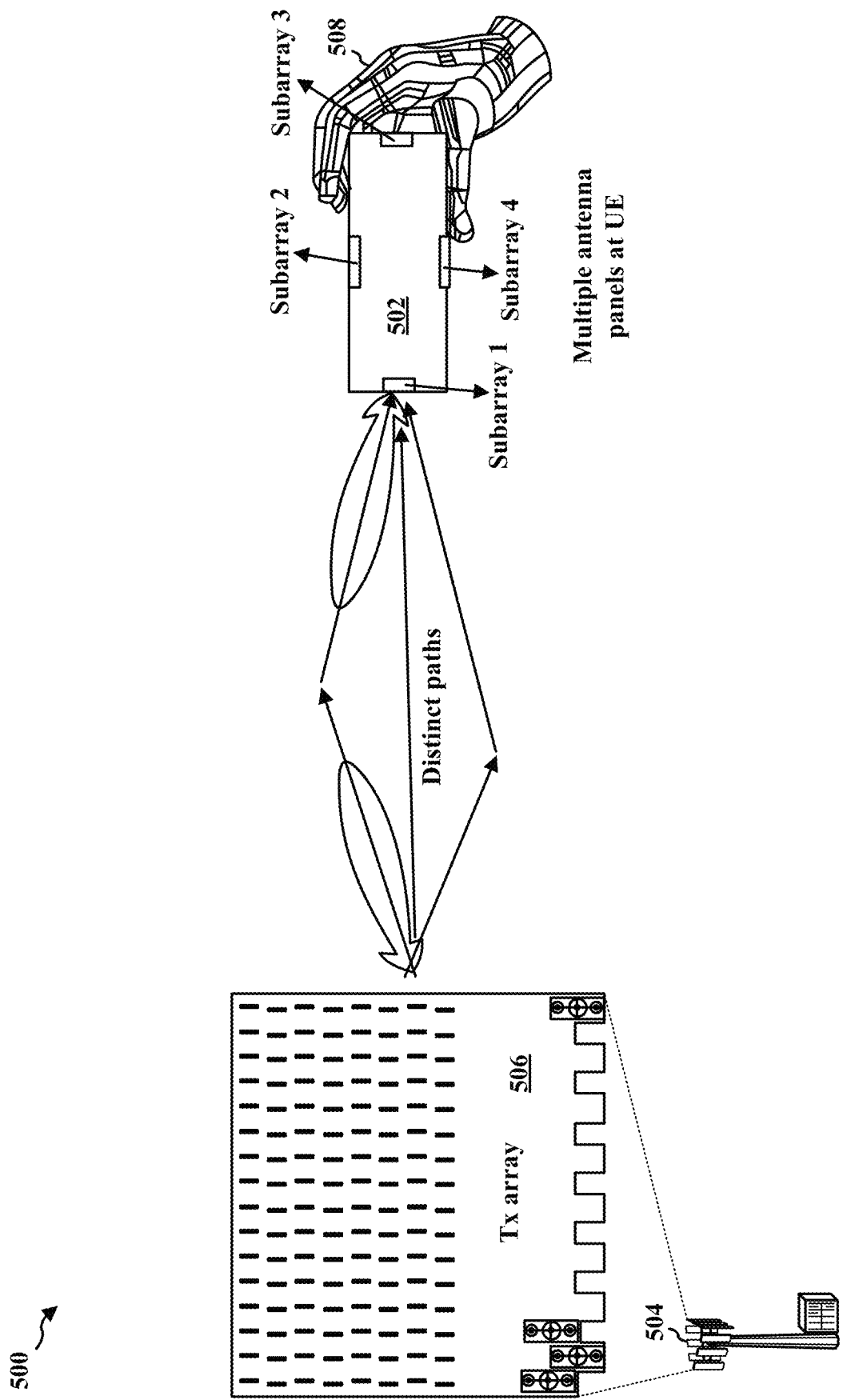
FIG. 5 illustrates a diagram indicative of communications associated with hand blockage in a millimeter wave (mmW) system.

FIG. 5 illustrates a diagram 500 indicative of communications associated with hand blockage in a millimeter wave (mmW) system. A plurality of antennas (e.g., subarrays 1-4 and/or Tx array 506) may be incorporated at a UE 502 and/or a base station 504 in a mmW system. For instance, beamforming via multiple antennas of the Tx array 506 and the subarrays 1-4 may be used to provide a link between the UE 502 and the base station 504. In an example, codebook-based/directional beamforming may be used at both the UE-side of the link and the base station-side of the link.

Blockage losses caused by a hand 508 or other body part of a user of the UE 502 may decrease a performance of mmW transmissions. When the hand 508 obstructs an antenna module/panel at the UE 502 being used to generate one or more signals for communicating with the base station 504 via mmW frequencies, features of the hand 508 may have an impact on associated carrier wavelengths. That is, the hand 508 may cause constructive interference or destructive interference that causes signal degradation (e.g., from 2-3 decibels (dB) up to 30-40 dB). If the antenna module of the UE 502 degrades below a threshold amount, the UE 502 may switch from the blocked module (e.g., subarray 3) to an unblocked module (e.g., subarray 1) for maintaining communication with the base station 504. Hand blockages in mmW communications may be based on communications between the UE 502 and the base station 504 in comparison to communications based on lower frequencies.

Hand blockage mitigation techniques may be learned via ML models in association with sensor inputs and adaptive beam weights applied to transmitted beams. Transfer learning (TL) is an ML technique where a first model developed for a first task may be reused as a starting point for a second model developed for a second task. Federated learning (FL), which may also be referred to as collaborative learning, is an ML technique where an algorithm may be trained across multiple decentralized edge devices/servers including local data samples, without exchanging the data samples between the devices. FL techniques may be different from centralized ML techniques, where the local datasets are uploaded to a same server. FL techniques may also be different from decentralized ML techniques, which may be based on an assumption that the local data samples are evenly distributed across the devices.

The UE 502 may transmit a request to the base station 504 for one or more reference signals after the UE 502 determines that signal degradation (e.g., associated with subarray 3) is based on a hand blockage. The base station 504 may grant the request for the one or more reference signals and transmit the one or more reference signals to the UE 502. The UE 502 may determine, based on the one or more reference signals, one or more beam weights that may be applied to beams transmitted from the UE 502 to decrease signal degradations caused by the hand blockage. An increased number of antenna elements included in the UE 502 may correspond to an increased timeframe for the UE 502 to determine the beam weights, which may result in increased power consumption, latency, etc. Thus, neural network (NN)/ML information associated with hand blockage may be transferred to a same UE (e.g., the UE 502) at a different point in time, or to one or more different UEs, for decreasing the processing time of the UE(s) for determining hand blockage mitigation techniques.

For example, a particular user of the UE 502 may have a particular hand property/hand grip, which may cover certain antenna subarrays. The UE 502 may be configured to convert sensor inputs of the UE 502 into ML inferences for a type/configuration of the hand property/hand grip, which may be utilized to determine beam weights for hand blockage mitigation. The NN/ML information may be transmitted to the base station 504 as an ML model based on learned parameters associated with the hand blockage. The base station 504 may generate inferences based on the ML model that may reduce the processing time for determining beam weights for a different UE, or for determining the beam weights for the same UE (e.g., the UE 502) at a different point in time.

Figure 6:
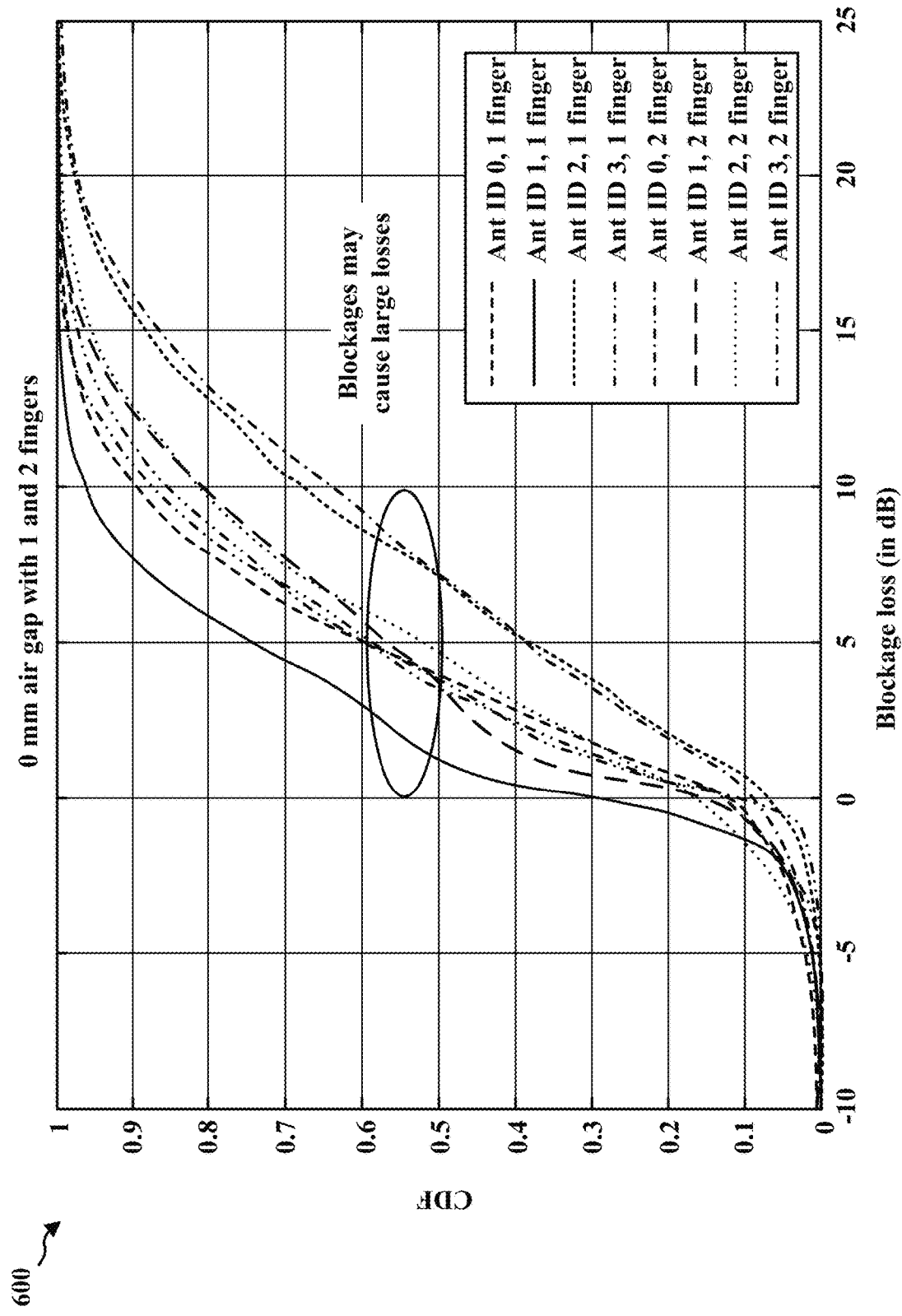
FIG. 6 is a graph indicative of hand blockage measurement data.

FIG. 6 is a graph 600 indicative of hand blockage measurement data. The measurement data may be based on a blockage loss in dB relative to a cumulative density function (CDF). The per antenna element losses of the graph 600 may correspond to a median loss for an individual antenna element that ranges from 2 dB to 8 dB. In the 90th percentile, losses may be in the range of 12-13 dB. The losses indicated via the graph 600 caused by hand blockages may be incurred in addition to regular channel losses. Thus, the net effect of combining 4 antenna elements (e.g., subarrays 1-4) may correspond to loses of up to 30-40 dB. Further, the UE 502 may include a certain number of antenna modules/panels based on a coverage area, signal diversity, and/or manufacturing cost of the UE 502.

The UE 502 may be configured to switch antenna modules/beams for mitigating hand blockages. For example, the UE may switch antenna modules/panels and/or use an improved beam in a same or different module for communicating with the base station 504. If the hand 508 covers an antenna module that includes an established link with the base station 504, the UE 502 may switch to a different antenna module to establish a different link with the base station 504. The switching may be within the same TRP serving the UE, or the switching may be to a different TRP (e.g., associated with a dense network that includes multiple TRPs) via a handover technique. Such techniques may be associated with rich channels that allow for module/beam switching. Rich channels may be channels that include an increased number of reflectors, such as metal, glass, etc.

In some cases, module/beam switching may not be used for hand blockage mitigation. However, beam switching may be performed if beam switching latencies are low (e.g., low time overhead) relative to time scales at which data disruption is at an acceptable threshold, or at time scales at which the channel properties change. Such determinations may be based on UE mobility. Beam switching may generate overhead in association with the control channel and may not be acceptable in some cases. If module/beam switching does not maintain a threshold level of performance, link degradation may be determined by the UE 502 as being caused by a hand blockage. Hand blockage losses may correspond to 2-20 dB depending on an angular spread of a cluster relative to an orientation and/or properties of the hand 508.

Fingers of the hand 508 may cause irregular reflections of signal energy, which may be corrected based on a phase shift and/or adjusting an amplitude of a dynamic or an adaptive set of beam weights. Rather than attempting to steer signal energy in a certain direction, a 4 element antenna array may be used for generating dynamic beam weights. Adjusting phase shifter combinations over the 4 antenna elements may constructively add signal energy in a particular direction, despite the existence of a hand blockage. Dynamic beam weights may be provided via the phase shifter and the amplitude adjustments to improve skewed/degraded signals caused by the blockage (e.g., the hand 508). Phase changes may be learned to predict a manner in which a hand blockage may skew/degrade the signal. Some operating modes of the mmW system may be based on periodic/aperiodic CSI-RS symbols, which may be signaled to the UE 502. Determining dynamic beam weights may increase in complexity based on an increased number of antenna elements, power/thermal considerations, maximum permissible exposure (MPE) protocols, etc.

ML techniques may be used in communications procedures, such as beam management, adaptive modulation and coding (e.g., error control code design), network planning (e.g., MAC layer procedures, TRP placement, repeater node deployment), etc. TL techniques may be performed in association with the ML techniques to store information determined for executing a first procedure and to apply the information to a different, but related, second procedure. In TL, a model may be learned from a set of representative data indicative of an average behavior. The learned averages may be stored in a central network and used to provide a decreased processing time for a different, but related, procedure. For example, the learned parameters may be used for a same UE (e.g., the UE 502) at a different point in time or for a different UE from the UE 502.

Figure 7:
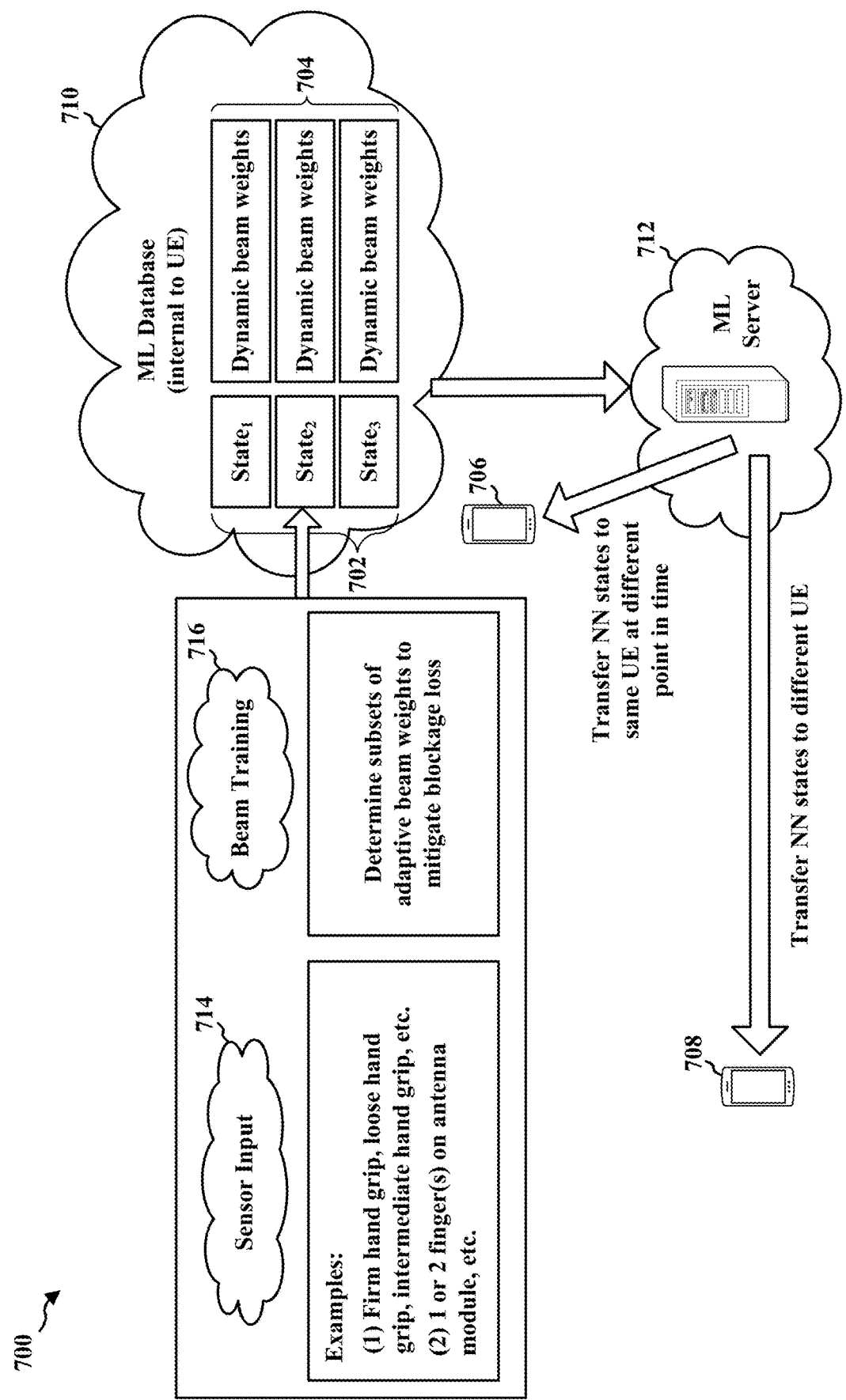
FIG. 7 illustrates a diagram of a transfer learning (TL) procedure.

FIG. 7 illustrates a diagram 700 of a TL procedure. TL techniques may be used for hand blockage mitigation. For example, hand grip configurations/states 702 may be provided as input for an ML model and mapped to dynamic beam weights 704 for mitigating the hand blockage. Some UEs may include sensors that may measure aspects of hand grips on a UE 706 (e.g., hand orientation, firmness of hand grip, number of fingers covering an antenna module, skin properties of a user that is holding the UE, etc.). After the NN has been learned based on the hand grip configurations/states 702, information from the learned NN may be transferred to an ML database 710, which may be internal to the UE 706, or to a centralized server (e.g., ML server 712) for decreasing a processing time associated with an inferencing procedure. For example, TL may be used to associate certain hand grip patterns (e.g., states 702) to certain applications executed by the same UE 706 over time or to applications executed across multiple UEs. TL may also be used to determine one or more beams to search over for mitigating a hand blockage based on sensor input 714 of the UEs 706-708.

Beam training 716 to determine a subset of adaptive beam weights for mitigating the blockage losses may be based on a hand grip configuration/pattern indicative via the sensor input 714. For example, a hard/firm hand grip may cause increased blockage losses (e.g., >20 dB), while a soft/loose hand grip may cause decreased blockage losses (e.g., <7.5 dB). An intermediate hand grip may cause an intermediate amount of blockage losses (e.g., 7.5-20 dB). Some hand grip configurations/patterns may correspond to a type of application that is executing on the UE 706. That is, some information may be mapped to hand grip pattern(s) based on a currently executing application of the UE 706. For example, a user may have a certain way of holding the UE 706 (e.g., sideways) for gaming and/or video applications, whereas the user may hold the UE 706 differently (e.g., vertical) for applications such as voice calls. Thus, a search space for beam weights 704 that may be used to mitigate blockage losses may be based on the sensor input 714 in association with the application that is executing on the UE 706.

Hand grip patterns/states 702 may correspond to applications where learning procedures may occur offline for multiple UEs 706-708. The hand grip pattern/state 702 of an ML model/NN may then be transferred to a different set of one or more UEs (e.g., the UE 708). Such TL techniques may decrease a timeframe for performing inferencing procedures. Hand grip patterns for applications such as voice calls, video applications, etc., may be determined dynamically for inferencing at a particular UE (e.g., the UEs 706-708). Rather than searching over a large space for beam weights 704, the UEs 706-708 may utilize learned information to perform a more narrowed search for the beam weights 704.

Some beam weights 704 may be more effective at mitigating hand blockages than other beam weights based on sensor input 714 of the UE 706. Sensor input 714 for different hand grip patterns/states 702 may be mapped to beam weights 704 that allow TL procedures to seed inputs to other UEs (e.g., the UE 708) and/or to a same UE 706 over time. The TL procedures may decrease a number of reference signals utilized for beam training 716, which may decrease both overhead and power consumption.

Sensor input 714 at the UE 706 may correspond to a hard/firm hand grip, soft/loose hand grip, an intermediate hand grip, etc. The sensor input 714 at the UE 706 may also correspond to hand/finger configurations relative to the UE 706 (e.g., 1-2 finger(s) may obstruct one or more antenna modules of the UE 706). The sensor input 714 may be indicative of beam weights 704 that may mitigate hand blockages (e.g., the UE 706 may perform beam training 716 to determine one or more subsets of adaptive beam weights for blockage loss mitigation). The ML database 710 internal to the UE 706 may be used to store one or more states 702 and one or more dynamic beam weights 704. The one or more states 702 may correspond to a type of hand grip (e.g., hard/firm handgrip) associated with a certain type of application, such that the one or more states 702 may be mapped to the one or more dynamic beam weights 704. Thus, the ML database 710 may correspond to an abstract space of inputs, compared to a numerical space of complex beam weights used to mitigate blockage loss for a particular application. That is, the states 702 may correspond to the input of the ML model, whereas the dynamic beam weights 704 may correspond to the output of the ML model, such that the ML model may be learned to map the input/states 702 to the output/dynamic beam weights 704.

Learning procedures for the NN may be performed at the ML server 712. However, some UEs may include an ML/NN engine, such that functionalities of the ML server 712 may be performed at the UE 706. For an external ML server, such as an external node in the network, the states 702 and the dynamic beam weights 704 may be communicated from the UE 706 to the external ML server 712. After the ML server 712 learns the NN, the ML server 712 may transfer NN states to a same UE 706 at different points in time and/or transfer the NN states to one or more different UEs, such as the UE 708. Transferring the NN states from the ML server 712 may be based on a predefined communication protocol, regardless of whether the ML server 712 is internal to the UE 706 or external to the UE 706.

Learnable states 702 communicated from UE 706 to a base station/ML server 712 may correspond to sensor input 714 for an application that is executing on the UE 706 (e.g., gaming, video, voice, etc.) and a state mapping between the application and the type of hand grip. A second learnable state 702 may include a device identifier (ID) and a protective cover ID (e.g., indicative of a material property of a protective cover of the UE 706, such as plastic, glass, etc.) that may allow the NN to estimate an impact of a hand grip on a radiation performance of an antenna module. For mmW communications, some materials may cause large losses (e.g., materials with an increased refractive index, such as glass). However, such materials may be UE-specific. The UE 706 may determine protective cover information in the binary (e.g., the UE 706 may determine that the UE 706 has a protective cover or does not have a protective cover) based on distortions to beam patterns. Additionally or alternatively, the UE 706 may be configured to determine a material property of the protective cover (e.g., via capacitive sensors, a frequency-modulated continuous wave (FMCW) radar of the UE 706, etc.) via measured data identified in data ranges indicative of the material property. A third learnable state 702 may include left/right hand usages/blockages. A fourth learnable state 702 may include hand grip patterns associated with mapped sensor input 714 to beam weights 704 that provide performance improvements in association with the blockage. A hand grip state space may be quantized based on quantization rules that may be predetermined or agreed upon between the UE and the network, and an index to the states 702 may be transmitted to the base station/ML server 712 for TL procedures associated with hand blockage mitigation.

The ML database 710, which may include learned states 702, sensor mappings, etc., may reside at the ML server 712 in the network. For example, FL may be used to collect and combine learned NN information from different UEs and TL may be used to transfer the information to a UE that has not learned a NN. Transferring the information from one or more UEs to a different UE (e.g., the UE 708) may be based on a communication protocol, where communicating the learned states associated with the NN across UEs may occur over-the-air/wirelessly. UEs may communicate learned states 702 and mappings to sensors to the ML server 712. The ML server 712 may accumulate and process the information across the UEs. A UE may request a specific NN scenario-based model from the ML server 712, which may have been learned in association with a specific application. Based on the request from the UE, the ML server 712 may communicate information indicative of the learned states 702 to a different UE (e.g., the UE 708) or the same UE 706 at a different point in time.

The ML database 710 may also be located at the UE 706, which may improve memory, computational, and/or power performances. The base station/ML server 712 may trigger the UE 706 to search for a set of beam weights (e.g., perform a beam search) over a narrowed search space to reduce a processing time of the UE 706. For example, the UE 706 may obtain the states 702 via TL from the ML server 712 and repeatedly adapt the NN to more accurately correspond to patterns of the UE 706 for learning a UE-specific model.

Figure 8:
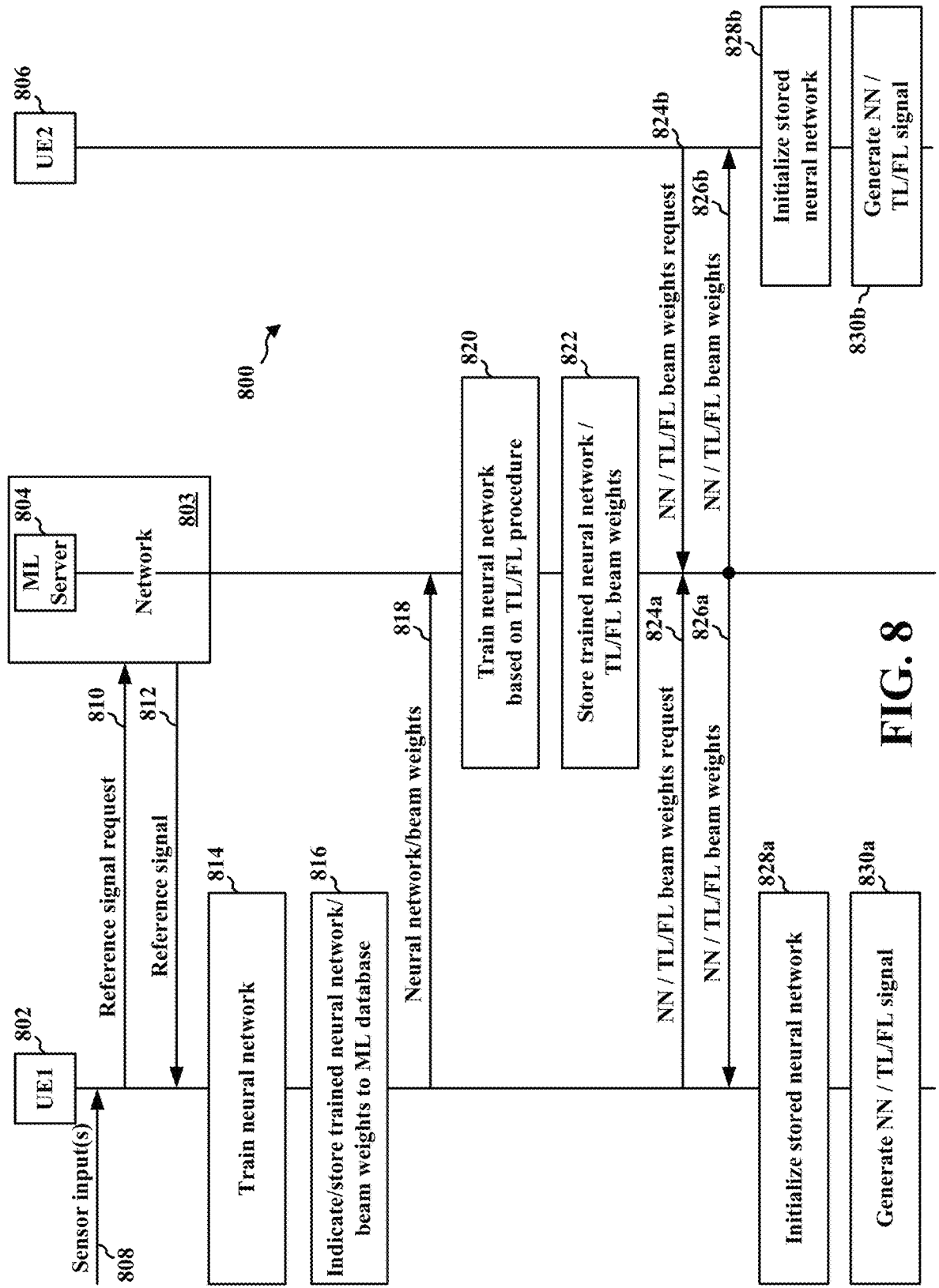
FIG. 8 is a call flow diagram illustrating communications between a UE and a machine learning (ML) server.

FIG. 8 is a call flow diagram 800 illustrating communications between a first UE 802, an ML server 804, and a second UE 806. At 808, the first UE 802 may receive sensor input(s) that may be utilized for training a neural network. The first UE 802 may be configured to convert the sensor input(s) into ML inferences for a type/configuration of a hand property/hand grip, which may be utilized to determine beam weights for hand blockage mitigation. For example, the sensor input(s) may be indicative of measurements associated with a hand grip and/or a hand orientation relative to the first UE 802 (e.g., firmness of hand grip, number of fingers covering an antenna module, one-handed grip/two-handed grip, left/right hand grip etc.).

At 810, the first UE 802 may transmit a reference signal request to the network 803 based on a hand blockage determined at the first UE 802 via the sensor input(s) received, at 808. At 812, the first UE 802 may receive a reference signal from the network 803. The reference signal received, at 812, may be used by the first UE 802 to train, at 814, a neural network to learn more or more beam weights that mitigate the hand blockage. At 816, the trained neural network/beam weights may be indicated to and stored in an ML database at the first UE 802. At 818, the first UE may indicate the neural network/beam weights to the ML server 804. In some cases, the ML server 804 may be located at the network 803, as illustrated in the call flow diagram 800. In other cases, the ML server 804 may be located at a UE (e.g., the first UE 802 and/or the second UE 806).

At 820, the ML server 804 may train the neural network based on a TL/FL procedure. The TL/FL procedure may be based on the neural network/beam weights received, at 818, from the first UE 802. At 822, the ML server 804 may store the trained neural network and the TL/FL beam weights (e.g., at an ML database located at the network 803).

At 824a-824b, the ML server 804 may receive from the first UE 802 and/or the second UE 806 a request for the neural network/beam weights that were learned via the TL/FL procedure. At 826a-826b, the ML server 804 may indicate to the first UE 802 and/or the second UE 806 the neural network associated with the TL/FL beam weights based on the request received, at 824a-824b, from the first UE 802 and/or the second UE 806.

At 828a-828b, the first UE 802 and/or the second UE 806 may initialize a neural network that is stored at the first UE 802 and/or the second UE 806 based on receiving, at 826a-826b from the ML server 804, the neural network associated with the TL/FL beam weights. For example, the neural network stored at the first UE 802 may correspond to the neural network that was trained, at 814, by the first UE 802, where initializing the stored neural network, at 828a, may cause the stored neural network to be updated based on the reception, at 826a, from the ML server 804. At 830a-830b, the first UE 802 and/or the second UE 806 may generate a TL/FL signal based on the neural network trained, at 820, via the TL/FL procedure.

Figure 9:
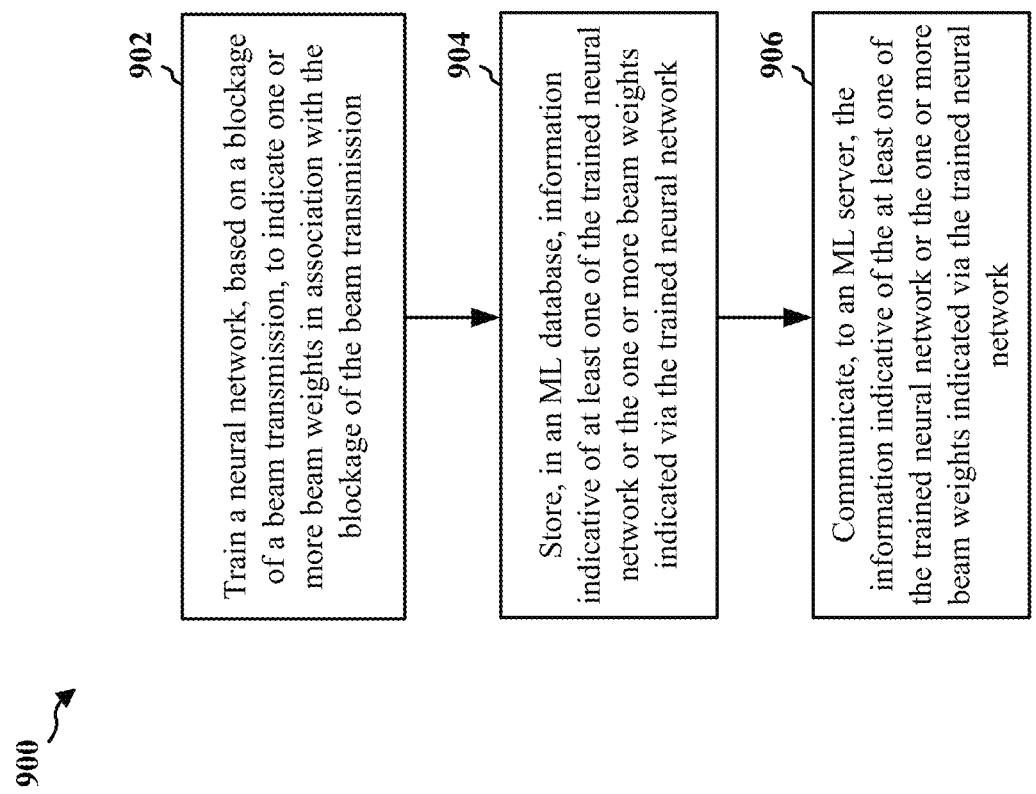
FIG. 9 is a flowchart of a method of wireless communication at a UE.

FIG. 9 is a flowchart 900 of a method of wireless communication. The method may be performed by a UE (e.g., the UE 104, 402, 502, 706, 708, 802, 806; the apparatus 1502; etc.), which may include the memory 360 and which may be the entire UE 104, 402, 502, 706, 708, 802, 806 or a component of the UE 104, 402, 502, 706, 708, 802, 806, such as the TX processor 368, the RX processor 356, and/or the controller/processor 359.

At 902, the UE may train a neural network, based on a blockage of a beam transmission, to indicate one or more beam weights in association with the blockage of the beam transmission. For example, referring to FIGS. 7-8, the first UE 802 may train, at 814, the neural network via the reference signal received, at 812, from the ML server 804. The first UE 802 may indicate, at 816, the trained neural network/beam weights to an ML database. In the diagram 700, the UE 706 may perform beam training 716 for indicating beam weights to the ML database 710. The training, at 902, may be performed by the training component 1540 of the apparatus 1502 in FIG. 15.

At 904, the UE may store, in an ML database, information indicative of at least one of the trained neural network or the one or more beam weights indicated via the trained neural network. For example, referring to FIGS. 7-8, the first UE 802 may store, at 816, the trained neural network/beam weights in the ML database. In the diagram 700, the UE 706 may store the beam weights 704 in the ML database 710 based one beam training 716. The storing, at 904, may be performed by the storage component 1544 of the apparatus 1502 in FIG. 15.

At 906, the UE may communicate, to an ML server, the information indicative of the at least one of the trained neural network or the one or more beam weights indicated via the trained neural network. For example, referring to FIG. 8, the first UE 802 may transmit, at 818, the neural network/beam weights to the ML server 804. In the diagram 700, the UE 706 may communicate information associated with the states 702 and the beam weights 704 from the ML database 710 to the ML server 712. The communication, at 906, may be performed by the communication component 1546 of the apparatus 1502 in FIG. 15.

Figure 10:
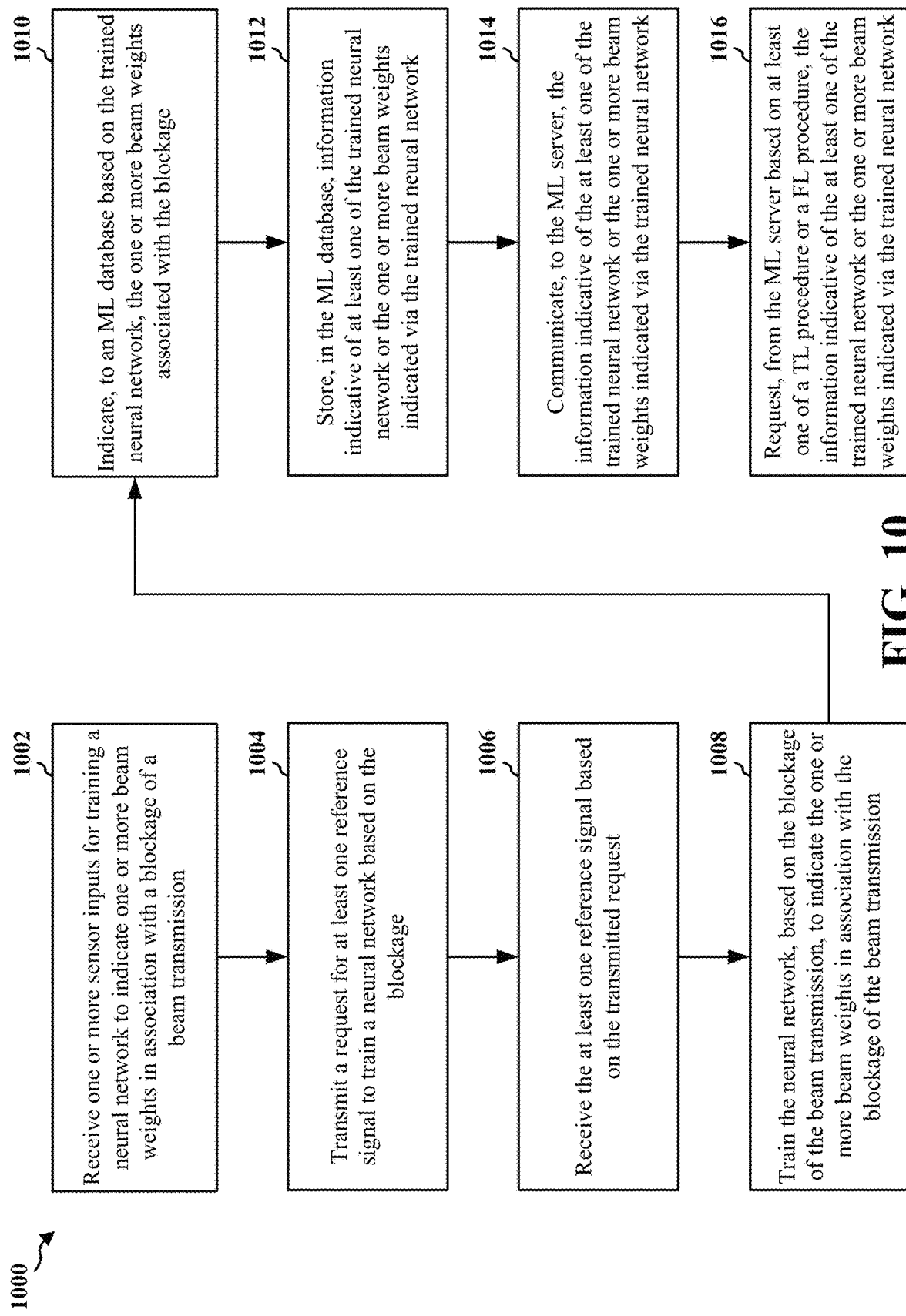
FIG. 10 is a flowchart of a method of wireless communication at a UE.

FIG. 10 is a flowchart 1000 of a method of wireless communication. The method may be performed by a UE (e.g., the UE 104, 402, 502, 706, 708, 802, 806; the apparatus 1502; etc.), which may include the memory 360 and which may be the entire UE 104, 402, 502, 706, 708, 802, 806 or a component of the UE 104, 402, 502, 706, 708, 802, 806, such as the TX processor 368, the RX processor 356, and/or the controller/processor 359.

At 1002, the UE may receive one or more sensor inputs for training a neural network to indicate one or more beam weights in association with a blockage of a beam transmission. For example, referring to FIGS. 7-8, the first UE 802 may receive sensor input(s), at 808, for training a neural network, at 814, which may be based on beam weights that are indicated/stored, at 816, to an ML database. The UE 706 may similarly receive sensor input 714 and perform beam training 716 to determine a subset of adaptive beam weights to mitigate blockage loss, where the beam weights may be indicated to the ML database 710. The reception, at 1002, may be performed by the reception component 1530 of the apparatus 1502 in FIG. 15.

At 1004, the UE may transmit a request for at least one reference signal to train a neural network based on the blockage. For example, referring to FIG. 8, the first UE 802 may transmit, at 810, a reference signal request to the network 803 for training, at 814, the neural network based on the reference signal received, at 812, from the network

803. The transmission, at 1004, may be performed by the transmission component 1534 of the apparatus 1502 in FIG. 15.

At 1006, the UE may receive the at least one reference signal based on the transmitted request. For example, referring to FIG. 8, the first UE 802 may receive, at 812, the reference signal from the network 803 based on the reference signal request transmitted, at 810, to the network 803. The reception, at 1006, may be performed by the reception component 1530 of the apparatus 1502 in FIG. 15.

At 1008, the UE may train the neural network, based on the blockage of the beam transmission, to indicate the one or more beam weights in association with the blockage of the beam transmission. For example, referring to FIGS. 5 and 7-8, the first UE 802 may train, at 814, the neural network via the reference signal received, at 812, from the ML server 804. The first UE 802 may indicate, at 816, the trained neural network/beam weights to an ML database. In the diagram 700, the UE 706 may perform beam training 716 for indicating beam weights to the ML database 710. The blockage may be mapped to at least one of a hand orientation (e.g., of the hand 508), a hand property (e.g., of the hand 508), a skin property, a design parameter of the UE 502/706/802, an antenna module property (e.g., of the subarrays 1-4), an antenna array size (e.g., of the subarrays 1-4), boresight direction information, a beam property, a type of substrate material, RF circuit-related information, a first property of one or more first materials included in the UE 502/706/802, or a second property of one or more second materials that cover the UE 502/706/802. The hand orientation (e.g., of the hand 508) may correspond to at least one of a left-hand grip, a right-hand grip, a loose hand grip, a firm hand grip, an intermediate hand grip, or an indication of a finger orientation of at least one finger (e.g., of the hand 508) relative to an antenna module (e.g., subarrays 1-4) of the UE 502/706/802. The neural network may be trained (e.g., at 716/814) based on at least one of historical data indicative of the blockage, a signal strength associated with the blockage, or an application that is executing on the UE 706/802 at a time that the blockage occurs. The neural network may be trained (e.g., at 716/814) to indicate (e.g., at 816) the one or more beam weights 704 (e.g., to the ML database 710). The one or more beam weights 704 may correspond to at least one of an amplitude or a phase of one or more antenna elements (e.g., subarrays 1-4) configured for mmW communication. The training, at 1008, may be performed by the training component 1540 of the apparatus 1502 in FIG. 15.

At 1010, the UE may indicate, to an ML database based on the trained neural network, the one or more beam weights associated with the blockage. For example, referring to FIGS. 7-8, the first UE 802 may indicate, at 816, the trained neural network/beam weights to an ML database. In the diagram 700, the UE 706 may indicate the beam weights 704 to the ML database 710 based on the beam training 716. The indication, at 1010, may be performed by the indication component 1542 of the apparatus 1502 in FIG. 15.

At 1012, the UE may store, in the ML database, information indicative of at least one of the trained neural network or the one or more beam weights indicated via the trained neural network. For example, referring to FIGS. 7-8, the first UE 802 may store, at 816, the trained neural network/beam weights in the ML database. In the diagram 700, the UE 706 may store the beam weights 704 in the ML database 710 based one beam training 716. The storing, at 1012, may be performed by the storage component 1544 of the apparatus 1502 in FIG. 15.

At 1014, the UE may communicate, to the ML server, the information indicative of the at least one of the trained neural network or the one or more beam weights indicated via the trained neural network. For example, referring to FIG. 8, the first UE 802 may transmit, at 818, the neural network/beam weights to the ML server 804. In the diagram 700, the UE 706 may communicate information associated with the states 702 and the beam weights 704 from the ML database 710 to the ML server 712. In aspects, the ML server 710/804 may be located at the UE 706/802. The communication, at 1014, may be performed by the communication component 1546 of the apparatus 1502 in FIG. 15.

At 1016, the UE may request, from the ML server based on at least one of a TL procedure or a FL procedure, the information indicative of the at least one of the trained neural network or the one or more beam weights indicated via the trained neural network. For example, referring to FIG. 8, the first UE 802 may transmit, at 824a, a neural network/TL/FL beam weight request to the ML server 804. The requesting, at 1016, may be performed by the requester component 1548 of the apparatus 1502 in FIG. 15.

Figure 11:
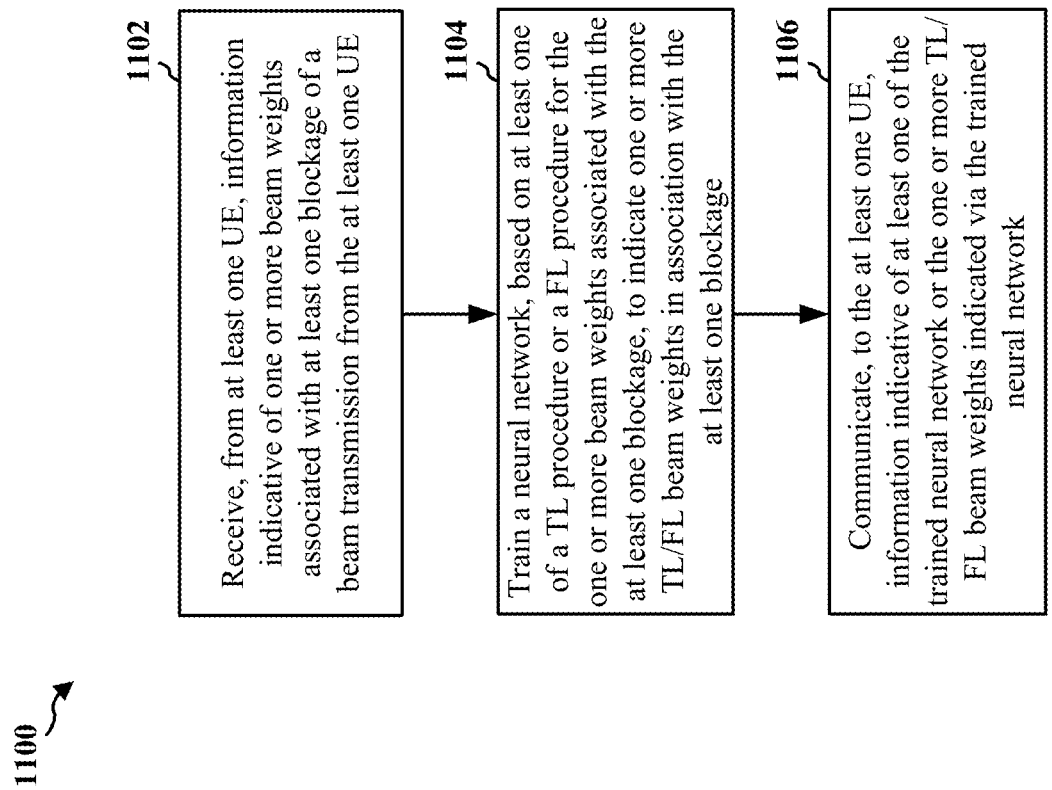
FIG. 11 is a flowchart of a method of wireless communication at an ML server.

FIG. 11 is a flowchart 1100 of a method of wireless communication. The method may be performed by an ML server (e.g., the ML server 712, 804; the base station 102, 504; the second device 404; the UE 104, 402, 502, 706, 708, 802, 806; the apparatus 1502; the apparatus 1602; etc.), which may include the memory 376 and which may be the entire ML server 712, 804 or a component of the ML server 712, 804, such as the TX processor 316, the RX processor 370, and/or the controller/processor 375.

At 1102, the ML server may receive, from at least one UE, information indicative of one or more beam weights associated with at least one blockage of a beam transmission from the at least one UE. For example, referring to FIGS. 7-8, the ML server 804 may receive, at 818, the neural network/beam weights from the first UE 802. In the diagram 700, the ML server 712 may receive from the UE 706 information associated with the states 702 and the beam weights 704 included in the ML database 710. The reception, at 1102, may be performed by either reception component 1530/1630 of the apparatus 1502 or the apparatus 1602 in FIGS. 15-16.

At 1104, the ML server may train a neural network, based on at least one of a TL procedure or a FL procedure for the one or more beam weights associated with the at least one blockage, to indicate one or more TL/FL beam weights in association with the at least one blockage. For example, referring to FIG. 8, the ML server 804 may train, at 820, the neural network based on a TL/FL procedure and indicate, at 826a-826b, the trained neural network/TL/FL beam weights to the first UE 802 and/or the second UE 806, based a neural network/TL/FL beam weight request received, at 824a-824b, from the first UE 802 and/or the second UE 806. The training, at 1104, may be performed by either training component 1540/1640 of the apparatus 1502 or the apparatus 1602 in FIGS. 15-16.

At 1106, the ML server may communicate, to the at least one UE, information indicative of at least one of the trained neural network or the one or more TL/FL beam weights indicated via the trained neural network. For example, referring to FIG. 8, the ML server 804 may transmit, at 826a-826b, the trained neural network/TL/FL beam weights to the first UE 802 and/or the second UE 806. The communication, at 1106, may be performed by either communication component 1546/1644 of the apparatus 1502 or the apparatus 1602 in FIGS. 15-16.

Figure 12:
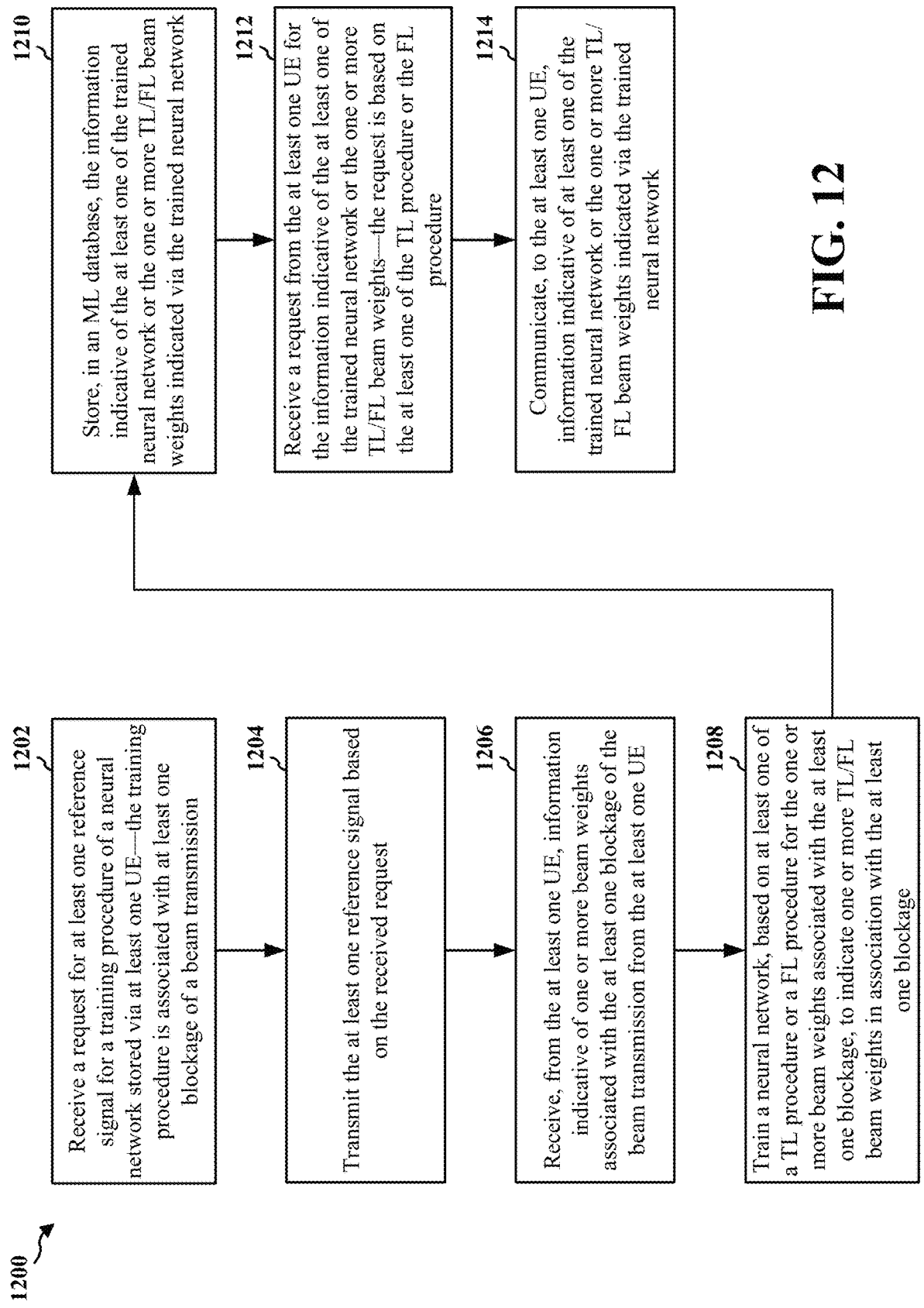
FIG. 12 is a flowchart of a method of wireless communication at an ML server.

FIG. 12 is a flowchart 1200 of a method of wireless communication. The method may be performed by an ML server (e.g., the ML server 712, 804; the base station 102, 504; the second device 404; the UE 104, 402, 502, 706, 708, 802, 806; the apparatus 1502; the apparatus 1602; etc.), which may include the memory 376 and which may be the entire ML server 712, 804 or a component of the ML server 712, 804, such as the TX processor 316, the RX processor 370, and/or the controller/processor 375.

At 1202, the ML server may receive a request for at least one reference signal for a training procedure of a neural network stored via at least one UE—the training procedure is associated with at least one blockage of a beam transmission. For example, referring to FIG. 8, the ML server 804 may receive, at 810 via the network 803, a reference signal request from the first UE 802 for training, at 814, the neural network based on the reference signal transmitted, at 812, to the first UE 802. The reception, at 1202, may be performed by either reception component 1530/1630 of the apparatus 1502 or the apparatus 1602 in FIGS. 15-16.

At 1204, the ML server may transmit the at least one reference signal based on the received request. For example, referring to FIG. 8, the ML server 804 may be located at a network entity that transmits, at 812, the reference signal to the first UE 802 based on the reference signal request received, at 810, from the first UE 802. The transmission, at 1204, may be performed by either transmission component 1534/1634 of the apparatus 1502 or the apparatus 1602 in FIGS. 15-16.

At 1206, the ML server may receive, from the at least one UE, information indicative of one or more beam weights associated with the at least one blockage of the beam transmission from the at least one UE. For example, referring to FIGS. 5 and 7-8, the ML server 804 may receive, at 818, the neural network/beam weights from the first UE 802. In the diagram 700, the ML server 712 may receive from the UE 706 information associated with the states 702 and the beam weights 704 included in the ML database 710. The blockage may be mapped to at least one of a hand orientation (e.g., of the hand 508), a hand property (e.g., of the hand 508), a skin property, a design parameter of the UE 502/706/802, an antenna module property (e.g., of the subarrays 1-4), an antenna array size (e.g., of the subarrays 1-4), boresight direction information, a beam property, a type of substrate material, RF circuit-related information, a first property of one or more first materials included in the UE 502/706/802, or a second property of one or more second materials that cover the UE 502/706/802. The hand orientation (e.g., of the hand 508) may correspond to at least one of a left-hand grip, a right-hand grip, a loose hand grip, a firm hand grip, an intermediate hand grip, or an indication of a finger orientation of at least one finger (e.g., of the hand 508) relative to an antenna module (e.g., subarrays 1-4) of the UE 502/706/802. The information received, at 818, from the first UE 802 may be based on at least one of historical data indicative of the blockage, a signal strength associated with the blockage, or an application that is executing on the first UE 802 at a time that the blockage occurs. The reception, at 1206, may be performed by either reception component 1530/1630 of the apparatus 1502 or the apparatus 1602 in FIGS. 15-16.

At 1208, the ML server may train a neural network, based on at least one of a TL procedure or a FL procedure for the one or more beam weights associated with the at least one blockage, to indicate one or more TL/FL beam weights in association with the at least one blockage. For example, referring to FIG. 8, the ML server 804 may train, at 820, the neural network based on a TL/FL procedure and indicate, at 826a-826b, the trained neural network/TL/FL beam weights to the first UE 802 and/or the second UE 806, based a neural network/TL/FL beam weight request received, at 824a-824b, from the first UE 802 and/or the second UE 806. The training, at 1208, may be performed by either training component 1540/1640 of the apparatus 1502 or the apparatus 1602 in FIGS. 15-16.

At 1210, the ML server may store, in an ML database, the information indicative of the at least one of the trained neural network or the one or more TL/FL beam weights indicated via the trained neural network. For example, referring to FIG. 8, the ML server 804 may store, at 822, the trained neural network/TL/FL beam weights in an ML database. In aspects, the ML database may be located at the ML server 804. The storing, at 1210, may be performed by either storage component 1544/1642 of the apparatus 1502 or the apparatus 1602 in FIGS. 15-16.

At 1212, the ML server may receive a request from the at least one UE for the information indicative of the at least one of the trained neural network or the one or more TL/FL beam weights—the request is based on the at least one of the TL procedure or the FL procedure. For example, referring to FIG. 8, the ML server 804 may receive, at 824a-824b, a neural network/TL/FL beam weights request from the first UE 802 and/or the second UE 806 for the trained neural network/TL/FL beam weights stored, at 822, at the ML server 804. The reception, at 1212, may be performed by either reception component 1530/1630 of the apparatus 1502 or the apparatus 1602 in FIGS. 15-16.

At 1214, the ML server may communicate, to the at least one UE, information indicative of at least one of the trained neural network or the one or more TL/FL beam weights indicated via the trained neural network. For example, referring to FIG. 8, the ML server 804 may transmit, at 826a-826b, the trained neural network/TL/FL beam weights to the first UE 802 and/or the second UE 806. The information communicated, at 826a-826b, to the first UE 802 and/or the second UE 806 may be configured to initialize, at 828a-828b, a neural network stored the first UE 802 and/or the second UE 806 in association with the at least one blockage. The ML server 804 may communicate, at 826a, the information indicative of the at least one of the trained neural network or the one or more TL/FL beam weights to a same UE (e.g., the first UE 802) of the at least one UE from which the ML server 804 received, at 818, the information indicative of the one or more beam weights. Additionally or alternatively, the ML server 804 may communicate, at 826b, the information indicative of the at least one of the trained neural network or the one or more TL/FL beam weights to a different UE (e.g., the second UE 806) of the at least one UE from which the ML server 804 received, at 818, the information indicative of the one or more beam weights. The communication, at 1214, may be performed by either communication component 1546/1644 of the apparatus 1502 or the apparatus 1602 in FIGS. 15-16.

Figure 13:
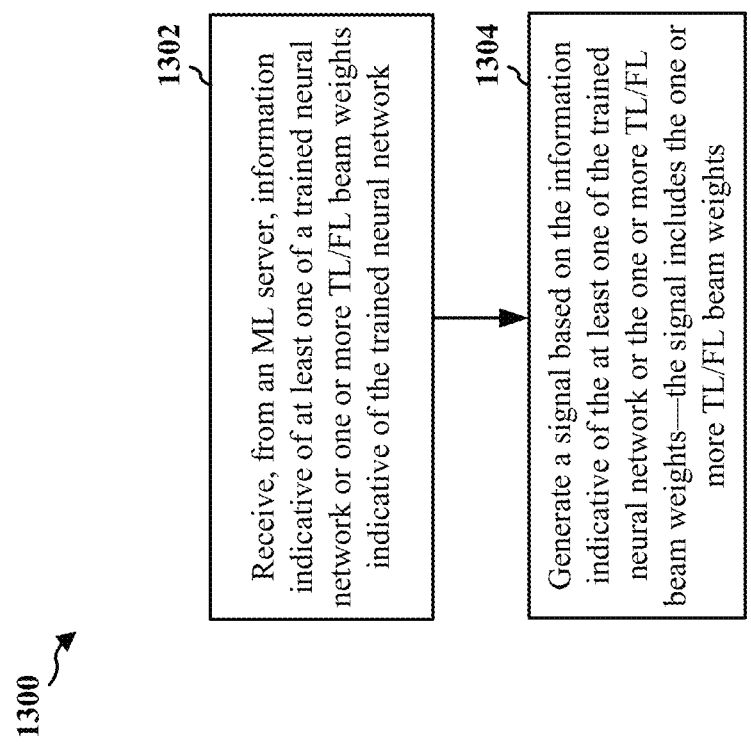
FIG. 13 is a flowchart of a method of wireless communication at a UE.

FIG. 13 is a flowchart 1300 of a method of wireless communication. The method may be performed by a UE (e.g., the UE 104, 402, 502, 706, 708, 802, 806; the apparatus 1502; etc.), which may include the memory 360 and which may be the entire UE 104, 402, 502, 706, 708, 802, 806 or a component of the UE 104, 402, 502, 706, 708, 802, 806, such as the TX processor 368, the RX processor 356, and/or the controller/processor 359.

At 1302, the UE may receive, from an ML server, information indicative of at least one of a trained neural network or one or more TL/FL beam weights indicative of the trained neural network. For example, referring to FIG. 8, the first UE 802 and/or the second UE 806 may receive, at 826a-826b, neural network/TL/FL beam weights based on the request transmitted, at 824a-824b, for the neural network/TL/FL beam weights. The reception, at 1302, may be performed by the reception component 1530 of the apparatus 1502 in FIG. 15.

At 1304, the UE may generate a signal based on the information indicative of the at least one of the trained neural network or the one or more TL/FL beam weights— the signal includes the one or more TL/FL beam weights. For example, referring to FIG. 8, the first UE 802 and/or the second UE 806 may generate, at 830a-830b, a neural network/TL/FL signal based on the neural network/TL/FL beam weights received, at 826a-826b, from the ML server. The generation, at 1304, may be performed by the generation component 1552 of the apparatus 1502 in FIG. 15.

Figure 14:
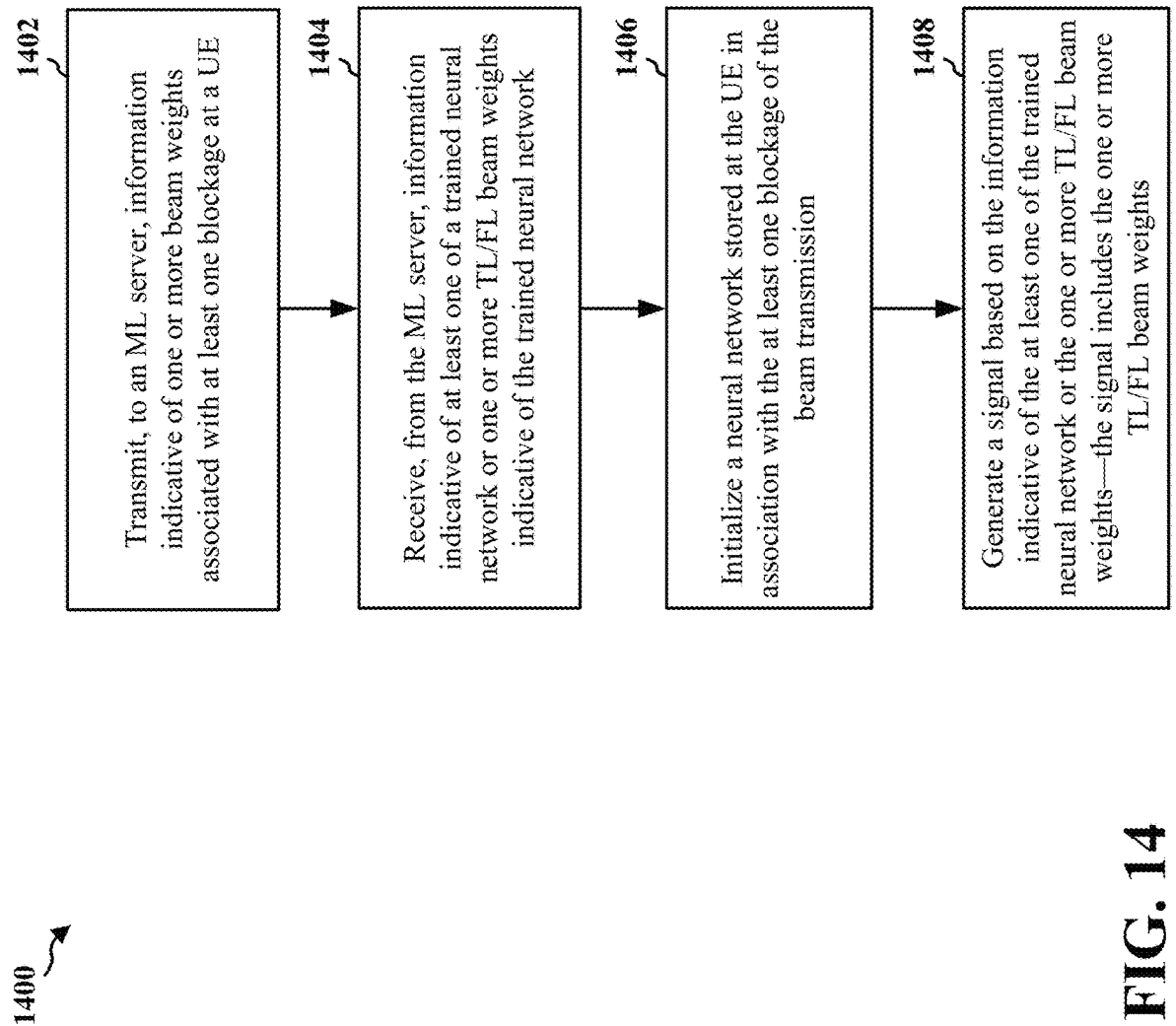
FIG. 14 is a flowchart of a method of wireless communication at a UE.

FIG. 14 is a flowchart 1400 of a method of wireless communication. The method may be performed by a UE (e.g., the UE 104, 402, 502, 706, 708, 802, 806; the apparatus 1502; etc.), which may include the memory 360 and which may be the entire UE 104, 402, 502, 706, 708, 802, 806 or a component of the UE 104, 402, 502, 706, 708, 802, 806, such as the TX processor 368, the RX processor 356, and/or the controller/processor 359.

At 1402, the UE may transmit, to an ML server, information indicative of one or more beam weights associated with at least one blockage at a UE. For example, referring to FIG. 8, the first UE 802 and/or the second UE 806 may transmit, at 824a-824b, a neural network/TL/FL beam weights request to the ML server 804. The transmission, at 1402, may be performed by the transmission component 1534 of the apparatus 1502 in FIG. 15.

At 1404, the UE may receive, from the ML server, information indicative of at least one of a trained neural network or one or more TL/FL beam weights indicative of the trained neural network. For example, referring to FIG. 8, the first UE 802 and/or the second UE 806 may receive, at 826a-826b, neural network/TL/FL beam weights based on the request transmitted, at 824a-824b, for the neural network/TL/FL beam weights. The UE may be a same UE (e.g., the first UE 802) as a TL/FL UE that communicates, at 818, information to the ML server 804 for training, at 820, the neural network based on at least one of a TL procedure or an FL procedure. Alternatively, the UE may be a different UE (e.g., the second UE 806) from the TL/FL UE (e.g., the first UE 802) that communicates, at 818, information to the ML server 804 for training, at 820, the neural network based on at least one of a TL procedure or an FL procedure. The reception, at 1404, may be performed by the reception component 1530 of the apparatus 1502 in FIG. 15.

At 1406, the UE may initialize a neural network stored at the UE in association with the at least one blockage of the beam transmission. For example, referring to FIGS. 5 and 7-8, the first UE 802 and/or the second UE 806 may initialize, at 828a-828b, a stored neural network. For instance, the stored neural network at the first UE 802 may correspond to the neural network that was trained, at 814, by the first UE 802. The blockage may be mapped to at least one of a hand orientation (e.g., of the hand 508), a hand property (e.g., of the hand 508), a skin property, a design parameter of the UE 502/708/806, an antenna module property (e.g., of the subarrays 1-4), an antenna array size (e.g., of the subarrays 1-4), boresight direction information, a beam property, a type of substrate material, RF circuit-related information, a first property of one or more first materials included in the UE 502/708/806, or a second property of one or more second materials that cover the UE 502/708/806. The initialization, at 1406, may be performed by the initialization component 1550 of the apparatus 1502 in FIG. 15.

At 1408, the UE may generate a signal based on the information indicative of the at least one of the trained neural network or the one or more TL/FL beam weights— the signal includes the one or more TL/FL beam weights. For example, referring to FIG. 8, the first UE 802 and/or the second UE 806 may generate, at 830a-830b, a neural network/TL/FL signal based on the neural network/TL/FL beam weights received, at 826a-826b, from the ML server. The generation, at 1408, may be performed by the generation component 1552 of the apparatus 1502 in FIG. 15.

Figure 15:
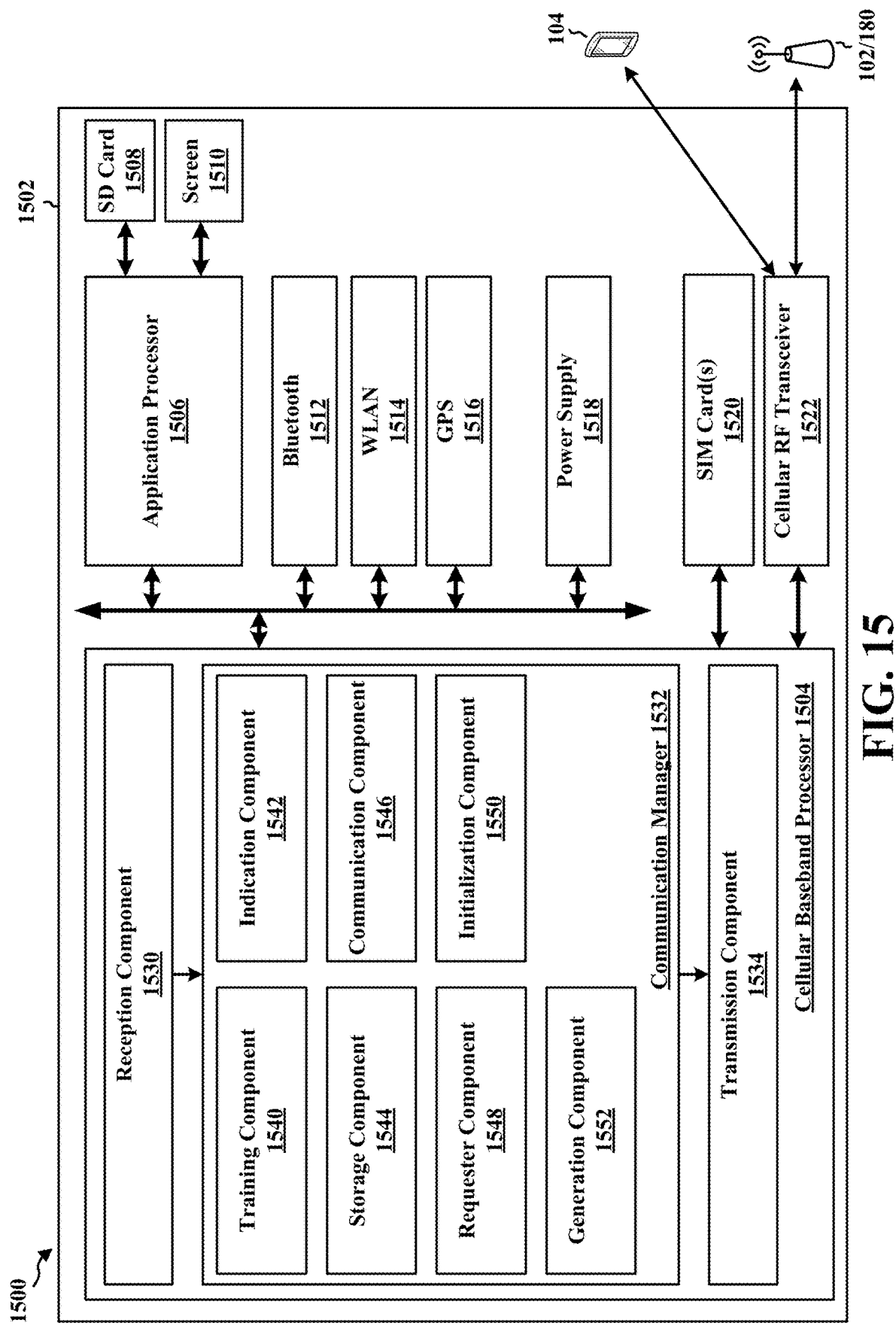
FIG. 15 is a diagram illustrating an example of a hardware implementation for an example apparatus.

FIG. 15 is a diagram 1500 illustrating an example of a hardware implementation for an apparatus 1502. The apparatus 1502 may be a UE, a component of a UE, or may implement UE functionality. In some aspects, the apparatus 1502 may include a cellular baseband processor 1504 (also referred to as a modem) coupled to a cellular RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The reception component 1530 is configured, e.g., as described in connection with 1002, 1006, 1102, 1202, 1206, 1212, 1302, and 1404, to receive one or more sensor inputs for training a neural network to indicate one or more beam weights in association with a blockage of a beam transmission; to receive the at least one reference signal based on the transmitted request; to receive a request for at least one reference signal for a training procedure of a neural network stored via at least one UE—the training procedure is associated with at least one blockage of a beam transmission; to receive, from the at least one UE, information indicative of one or more beam weights associated with the at least one blockage of the beam transmission from the at least one UE; to receive a request from the at least one UE for the information indicative of the at least one of the trained neural network or the one or more TL/FL beam weights—the request is based on the at least one of the TL procedure or the FL procedure; and to receive, from the ML server, information indicative of at least one of a trained neural network or one or more TL/FL beam weights indicative of the trained neural network.

The communication manager 1532 includes a training component 1540 that is configured, e.g., as described in connection with 902, 1008, 1104, and 1208, to train the neural network, based on the blockage of the beam transmission, to indicate the one or more beam weights in association with the blockage of the beam transmission; and to train a neural network, based on at least one of a TL procedure or a FL procedure for the one or more beam weights associated with the at least one blockage, to indicate one or more TL/FL beam weights in association with the at least one blockage. The communication manager 1532 further includes an indication component 1542 that is configured, e.g., as described in connection with 1010, to indicate, to an ML database based on the trained neural network, the one or more beam weights associated with the blockage. The communication manager 1532 further includes a storage component 1544 that is configured, e.g., as described in connection with 904, 1012, and 1210, to store, in the ML database, information indicative of at least one of the trained neural network or the one or more beam weights indicated via the trained neural network; and to store, in an ML database, the information indicative of the at least one of the trained neural network or the one or more TL/FL beam weights indicated via the trained neural network. The communication manager 1532 further includes a communication component 1546 that is configured, e.g., as described in connection with 906, 1014, 1106, and 1214, to communicate, to the ML server, the information indicative of the at least one of the trained neural network or the one or more beam weights indicated via the trained neural network; and to communicate, to the at least one UE, information indicative of at least one of the trained neural network or the one or more TL/FL beam weights indicated via the trained neural network. The communication manager 1532 further includes a requester component 1548 that is configured, e.g., as described in connection with 1016, to request, from the ML server based on at least one of a TL procedure or a FL procedure, the information indicative of the at least one of the trained neural network or the one or more beam weights indicated via the trained neural network.

The communication manager 1532 further includes an initialization component 1550 that is configured, e.g., as described in connection with 1406, to initialize a neural network stored at the UE in association with the at least one blockage of the beam transmission. The communication manager 1532 further includes a generation component 1552 that is configured, e.g., as described in connection with 1304 and 1408, to generate a signal based on the information indicative of the at least one of the trained neural network or the one or more TL/FL beam weights—the signal includes the one or more TL/FL beam weights.

The transmission component 1534 is configured, e.g., as described in connection with 1004, 1204, and 1402, to transmit a request for at least one reference signal to train a neural network based on the blockage; to transmit the at least one reference signal based on the received request; and to transmit, to an ML server, information indicative of one or more beam weights associated with at least one blockage at a UE.

The apparatus may include additional components that perform each of the blocks of the algorithm in the flowcharts of FIGS. 9-14. As such, each block in the flowcharts of FIGS. 9-14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the cellular baseband processor 1504, includes means for training a neural network, based on a blockage of a beam transmission, to indicate one or more beam weights in association with the blockage of the beam transmission; means for storing, in an ML database, information indicative of at least one of the trained neural network or the one or more beam weights indicated via the trained neural network; and means for communicating, to an ML server, the information indicative of the at least one of the trained neural network or the one or more beam weights indicated via the trained neural network. The apparatus 1502 further includes means for receiving one or more sensor inputs for training the neural network to indicate the one or more beam weights in association with the blockage. The apparatus 1502 further includes means for transmitting a request for at least one reference signal to train the neural network based on the blockage; and means for receiving the at least one reference signal based on the transmitted request. The apparatus 1502 further includes means for indicating, to the ML database based on the trained neural network, the one or more beam weights associated with the blockage. The apparatus 1502 further includes means for requesting, from the ML server based on at least one of a TL procedure or a FL procedure, the information indicative of the at least one of the trained neural network or the one or more beam weights indicated via the trained neural network.

In a further configuration, the apparatus 1502, and in particular the cellular baseband processor 1504, includes means for receiving, from at least one UE, information indicative of one or more beam weights associated with at least one blockage of a beam transmission from the at least one UE; means for training a neural network, based on at least one of a TL procedure or a FL procedure for the one or more beam weights associated with the at least one blockage, to indicate one or more TL/FL beam weights in association with the at least one blockage; and means for communicating, to the at least one UE, information indicative of at least one of the trained neural network or the one or more TL/FL beam weights indicated via the trained neural network. The apparatus 1502 further includes means for receiving a request for at least one reference signal for a training procedure of a neural network stored at the at least one UE, the training procedure associated with the at least one blockage; and means for transmitting the at least one reference signal based on the received request. The apparatus 1502 further includes means for storing, in an ML database, the information indicative of the at least one of the trained neural network or the one or more TL/FL beam weights indicated via the trained neural network. The apparatus 1502 further includes means for receiving a request from the at least one UE for the information indicative of the at least one of the trained neural network or the one or more TL/FL beam weights, the request based on the at least one of the TL procedure or the FL procedure.

In yet a further configuration, the apparatus 1502, and in particular the cellular baseband processor 1504, includes means for receiving, from an ML server, information indicative of at least one of a trained neural network or one or more TL/FL beam weights indicative of the trained neural network; and means for generating a signal based on the information indicative of the at least one of the trained neural network or the one or more TL/FL beam weights, the signal including the one or more TL/FL beam weights. The apparatus 1502 further includes means for initializing a neural network stored at the UE in association with at least one blockage of a beam transmission based on the reception of the information indicative of the at least one of the trained neural network or the one or more TL/FL beam weights. The apparatus 1502 further includes means for transmitting, to the ML server, information indicative of one or more beam weights associated with at least one blockage at the UE.

The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 16:
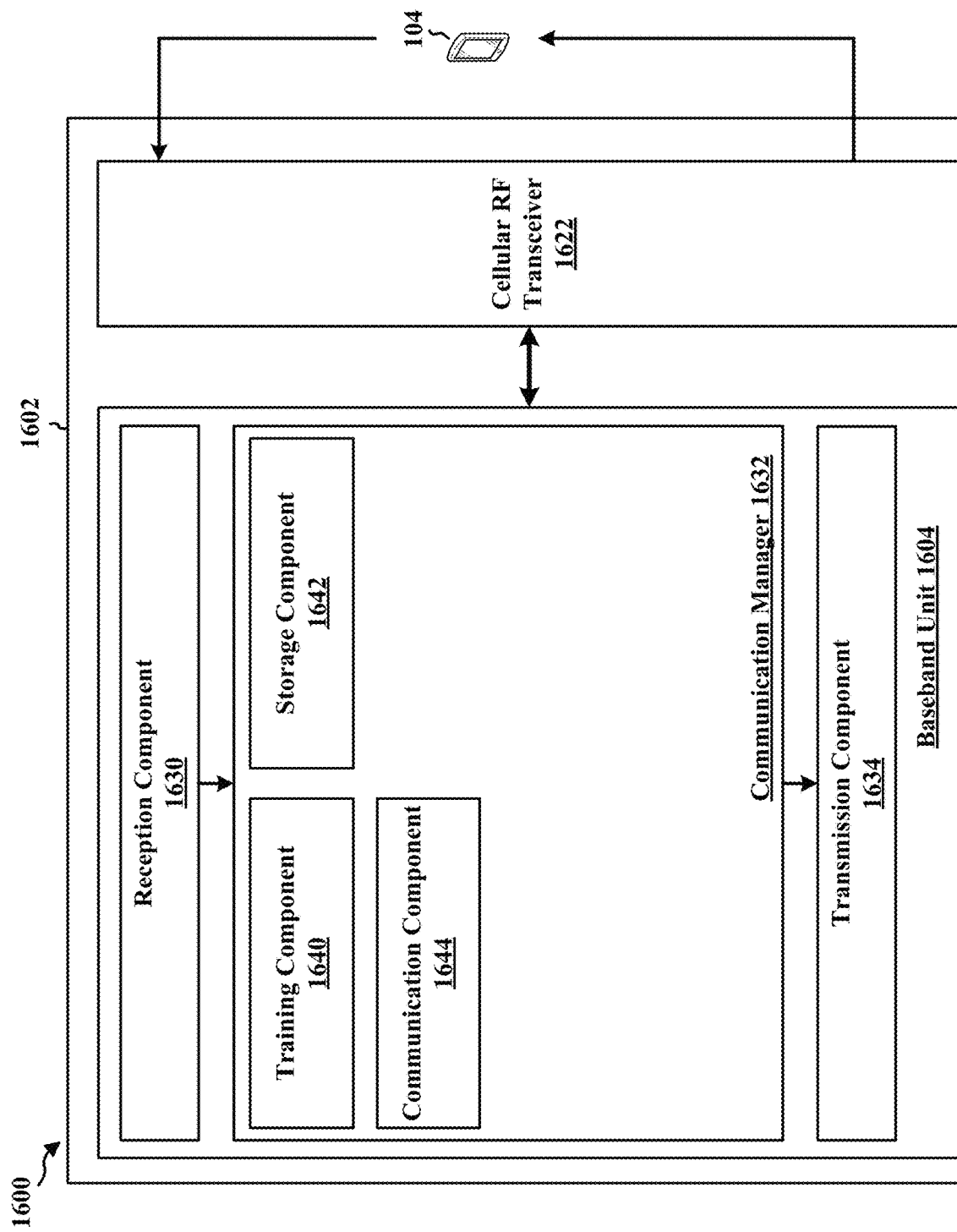
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1502 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a training component 1640 that is configured, e.g., as described in connection with 1104 and 1208, to train a neural network, based on at least one of a TL procedure or a FL procedure for the one or more beam weights associated with the at least one blockage, to indicate one or more TL/FL beam weights in association with the at least one blockage. The communication manager 1632 further includes a storage component 1642 that is configured, e.g., as described in connection with 1210, to store, in an ML database, the information indicative of the at least one of the trained neural network or the one or more TL/FL beam weights indicated via the trained neural network. The communication manager 1632 further includes a communication component 1644 that is configured, e.g., as described in connection with 1106 and 1214, to communicate, to the at least one UE, information indicative of at least one of the trained neural network or the one or more TL/FL beam weights indicated via the trained neural network.

The reception component 1630 is configured, e.g., as described in connection with 1102, 1202, 1206, and 1212, to receive a request for at least one reference signal for a training procedure of a neural network stored via at least one UE—the training procedure is associated with at least one blockage of a beam transmission; to receive, from the at least one UE, information indicative of one or more beam weights associated with the at least one blockage of the beam transmission from the at least one UE; and to receive a request from the at least one UE for the information indicative of the at least one of the trained neural network or the one or more TL/FL beam weights—the request is based on the at least one of the TL procedure or the FL procedure. The transmission component 1634 is configured, e.g., as described in connection with 1204, to transmit the at least one reference signal based on the received request.

The apparatus may include additional components that perform each of the blocks of the algorithm in the flowcharts of FIGS. 11-12. As such, each block in the flowcharts of FIGS. 11-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for receiving, from at least one UE, information indicative of one or more beam weights associated with at least one blockage of a beam transmission from the at least one UE; means for training a neural network, based on at least one of a TL procedure or a FL procedure for the one or more beam weights associated with the at least one blockage, to indicate one or more TL/FL beam weights in association with the at least one blockage; and means for communicating, to the at least one UE, information indicative of at least one of the trained neural network or the one or more TL/FL beam weights indicated via the trained neural network. The apparatus 1502 further includes means for receiving a request for at least one reference signal for a training procedure of a neural network stored at the at least one UE, the training procedure associated with the at least one blockage; and means for transmitting the at least one reference signal based on the received request. The apparatus 1502 further includes means for storing, in an ML database, the information indicative of the at least one of the trained neural network or the one or more TL/FL beam weights indicated via the trained neural network. The apparatus 1502 further includes means for receiving a request from the at least one UE for the information indicative of the at least one of the trained neural network or the one or more TL/FL beam weights, the request based on the at least one of the TL procedure or the FL procedure.

The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for communication at a UE including at least one processor coupled to a memory and configured to train a neural network, based on a blockage of a beam transmission, to indicate one or more beam weights in association with the blockage of the beam transmission; store, in an ML database, information indicative of at least one of the trained neural network or the one or more beam weights indicated via the trained neural network; and communicate, to an ML server, the information indicative of the at least one of the trained neural network or the one or more beam weights indicated via the trained neural network.

Aspect 2 may be combined with aspect 1 and includes that the blockage is mapped to at least one of a hand orientation, a hand property, a skin property, a design parameter of the UE, an antenna module property, an antenna array size, boresight direction information, a beam property, a type of substrate material, RF circuit-related information, a first property of one or more first materials included in the UE, or a second property of one or more second materials that cover the UE.

Aspect 3 may be combined with any of aspects 1-2 and includes that the hand orientation corresponds to at least one of a left-hand grip, a right-hand grip, a loose hand grip, a firm hand grip, an intermediate hand grip, or an indication of a finger orientation of at least one finger relative to an antenna module of the UE.

Aspect 4 may be combined with any of aspects 1-3 and includes that the neural network is trained based on at least one of historical data indicative of the blockage, a signal strength associated with the blockage, or an application that is executing on the UE at a time that the blockage occurs.

Aspect 5 may be combined with any of aspects 1-4 and includes that the neural network is trained to indicate the one or more beam weights, the one or more beam weights corresponding to at least one of an amplitude or a phase of one or more antenna elements configured for mmW communication.

Aspect 6 may be combined with any of aspects 1-5 and includes that the at least one processor is further configured to receive one or more sensor inputs for training the neural network to indicate the one or more beam weights in association with the blockage.

Aspect 7 may be combined with any of aspects 1-6 and includes that the at least one processor is further configured to: transmit a request for at least one reference signal to train the neural network based on the blockage; and receive the at least one reference signal based on the transmitted request.

Aspect 8 may be combined with any of aspects 1-7 and includes that the at least one processor is further configured to indicate, to the ML database based on the trained neural network, the one or more beam weights associated with the blockage.

Aspect 9 may be combined with any of aspects 1-8 and includes that the ML server is located at the UE.

Aspect 10 may be combined with any of aspects 1-9 and includes that the at least one processor is further configured to request, from the ML server based on at least one of a TL procedure or a FL procedure, the information indicative of the at least one of the trained neural network or the one or more beam weights indicated via the trained neural network.

Aspect 11 is an apparatus for communication at an ML server including at least one processor coupled to a memory and configured to receive, from at least one UE, information indicative of one or more beam weights associated with at least one blockage of a beam transmission from the at least one UE; train a neural network, based on at least one of a TL procedure or a FL procedure for the one or more beam weights associated with the at least one blockage, to indicate one or more TL/FL beam weights in association with the at least one blockage; and communicate, to the at least one UE, information indicative of at least one of the trained neural network or the one or more TL/FL beam weights indicated via the trained neural network.

Aspect 12 may be combined with aspect 11 and includes that the information communicated to the at least one UE is configured to initialize the neural network stored at the at least one UE in association with the at least one blockage.

Aspect 13 may be combined with any of aspects 11-12 and includes that the ML server communicates the information indicative of the at least one of the trained neural network or the one or more TL/FL beam weights to a same UE of the at least one UE from which the ML server receives the information indicative of the one or more beam weights.

Aspect 14 may be combined with any of aspects 11-12 and includes that the ML server communicates the information indicative of the at least one of the trained neural network or the one or more TL/FL beam weights to a different UE of the at least one UE from which the ML server receives the information indicative of the one or more beam weights.

Aspect 15 may be combined with any of aspects 11-14 and includes that the blockage is mapped to at least one of a hand orientation, a hand property, a skin property, a design parameter of the UE, an antenna module property, an antenna array size, boresight direction information, a beam property, a type of substrate material, RF circuit-related information, a first property of one or more first materials included in the UE, or a second property of one or more second materials that cover the UE.

Aspect 16 may be combined with any of aspects 11-15 and includes that the hand orientation corresponds to at least one of a left-hand grip, a right-hand grip, a loose hand grip, a firm hand grip, an intermediate hand grip, or an indication of a finger orientation of at least one finger relative to an antenna module of the UE.

Aspect 17 may be combined with any of aspects 11-16 and includes that the information received from the at the least one UE corresponds to at least one of historical data indicative of the blockage, a signal strength associated with the blockage, or an application that is executing on the UE at a time that the blockage occurs.

Aspect 18 may be combined with any of aspects 11-17 and includes that the at least one processor is further configured to: receive a request for at least one reference signal for a training procedure of the neural network stored at the at least one UE, the training procedure associated with the at least one blockage; and transmit the at least one reference signal based on the received request.

Aspect 19 may be combined with any of aspects 11-18 and includes that the at least one processor is further configured to store, in an ML database, the information indicative of the at least one of the trained neural network or the one or more TL/FL beam weights indicated via the trained neural network.

Aspect 20 may be combined with any of aspects 11-19 and includes that the ML database is located at the ML server.

Aspect 21 may be combined with any of aspects 11-20 and includes that the at least one processor is further configured to receive a request from the at least one UE for the information indicative of the at least one of the trained neural network or the one or more TL/FL beam weights, the request based on the at least one of the TL procedure or the FL procedure.

Aspect 22 is an apparatus for communication at a UE including at least one processor coupled to a memory and configured to: receive, from an ML server, information indicative of at least one of a trained neural network or one or more TL/FL beam weights indicative of the trained neural network; and generate a signal based on the information indicative of the at least one of the trained neural network or the one or more TL/FL beam weights, the signal including the one or more TL/FL beam weights.

Aspect 23 may be combined with aspect 22 and includes that the at least one processor is further configured to initialize a neural network stored at the UE in association with at least one blockage of a beam transmission based on the reception of the information indicative of the at least one of the trained neural network or the one or more TL/FL beam weights.

Aspect 24 may be combined with any of aspects 22-23 and includes that the at least one blockage is mapped to at least one of a hand orientation, a hand property, a skin property, a design parameter of the UE, an antenna module property, an antenna array size, boresight direction information, a beam property, a type of substrate material, RF circuit-related information, a first property of one or more first materials included in the UE, or a second property of one or more second materials that cover the UE.

Aspect 25 may be combined with any of aspects 22-24 and includes that the UE is a same UE as a TL/FL UE that communicates information to the ML server for training the neural network based on at least one of a TL procedure or an FL procedure.

Aspect 26 may be combined with any of aspects 22-24 and includes that the UE is a different UE from a TL/FL UE that communicates information to the ML server for training the neural network based on at least one of a TL procedure or an FL procedure.

Aspect 27 may be combined with any of aspects 22-26 and includes that the at least one processor is further configured to transmit, to the ML server, information indicative of one or more beam weights associated with at least one blockage at the UE.

Aspect 28 may be combined with any of aspects 1-27 and further includes a transceiver coupled to the at least one processor.

Aspect 29 is a method of wireless communication for implementing any of aspects 1-28.

Aspect 30 is an apparatus for wireless communication including means for implementing any of aspects 1-28.

Aspect 31 is a computer-readable medium storing computer executable code, the code when executed by at least one processor causes the at least one processor to implement any of aspects 1-28.

What is claimed is:

1. An apparatus for communication at a user equipment (UE), comprising:
   at least one memory; and
   at least one processor coupled to the at least one memory and configured to:
   train a neural network, based on a blockage of a beam transmission, to indicate one or more beam weights in association with the blockage of the beam transmission, wherein the blockage is mapped to at least one of a first property of one or more first materials included in the UE, a second property of one or more second materials that cover the UE, or a hand orientation corresponding to one of a left-hand grip or a right-hand grip wherein a hand grip state space associated with one of the left-hand grip or the right-hand grip is quantized based on at least one quantization rule, and wherein the at least one quantization rule is agreed upon between the UE and a network;

store, in a machine learning (ML) database, information indicative of at least one of the trained neural network or the one or more beam weights indicated via the trained neural network; and communicate, to an ML server, the information indicative of the at least one of the trained neural network or the one or more beam weights indicated via the trained neural network.

2. The apparatus of claim 1, wherein the blockage is further mapped to at least one of a hand property, a skin property, a design parameter of the UE, an antenna module property, an antenna array size, boresight direction information, a beam property, a type of substrate material, or radio frequency (RF) circuit-related information.

3. The apparatus of claim 1, wherein the hand orientation further corresponds to at least one of a loose hand grip, a firm hand grip, an intermediate hand grip, or an indication of a finger orientation of at least one finger relative to an antenna module of the UE.

4. The apparatus of claim 1, wherein to train the neural network, the at least one processor is configured to train the neural network further based on at least one of historical data indicative of the blockage, a signal strength associated with the blockage, or an application that is executing on the UE at a time that the blockage occurs.

5. The apparatus of claim 1, wherein to train the neural network, the at least one processor is configured to train the neural network to indicate the one or more beam weights, the one or more beam weights corresponding to at least one of an amplitude or a phase of one or more antenna elements configured for millimeter wave (mmW) communication.

6. The apparatus of claim 1, wherein the at least one processor is further configured to receive one or more sensor inputs for training the neural network to indicate the one or more beam weights in association with the blockage.

7. The apparatus of claim 1, wherein the at least one processor is further configured to:
transmit a request for at least one reference signal to train the neural network based on the blockage; and
receive the at least one reference signal based on the transmitted request.

8. The apparatus of claim 1, wherein the at least one processor is further configured to indicate, to the ML database based on the trained neural network, the one or more beam weights associated with the blockage.

9. The apparatus of claim 1, wherein the ML server is located at the UE.

10. The apparatus of claim 1, wherein the at least one processor is further configured to request, from the ML server based on at least one of a transfer learning (TL) procedure or a federated learning (FL) procedure, the information indicative of the at least one of the trained neural network or the one or more beam weights indicated via the trained neural network.

11. The apparatus of claim 1, further comprising a transceiver coupled to the at least one processor.

12. An apparatus for communication at a machine learning (ML) server, comprising:
at least one memory; and
at least one processor coupled to the at least one memory and configured to:
receive, from at least one user equipment (UE), information indicative of one or more beam weights associated with at least one blockage of a beam transmission from the at least one UE, wherein the at least one blockage is mapped to at least one of a first property of one or more first materials included in the at least one UE, a second property of one or more second materials that cover the at least one UE, or a hand orientation corresponding to at least one of a left-hand grip or a right-hand grip, wherein a hand grip state space associated with one of the left-hand grip or the right-hand grip is quantized based on at least one quantization rule, and wherein the at least one quantization rule is agreed upon between the UE and a network;
train a neural network, based on at least one of a transfer learning (TL) procedure or a federated learning (FL) procedure for the one or more beam weights associated with the at least one blockage, to indicate one or more TL or FL beam weights in association with the at least one blockage; and
communicate, to the at least one UE, information indicative of at least one of the trained neural network or the one or more TL or FL beam weights indicated via the trained neural network.

13. The apparatus of claim 12, wherein the information is configured to initialize the neural network stored at the at least one UE in association with the at least one blockage.

14. The apparatus of claim 12, wherein to receive the information indicative of the one or more beam weights and to communicate the information indicative of the at least one of the trained neural network or the one or more TL or FL beam weights, the at least one processor is configured to receive the information indicative of the one or more beam weights and communicate the information indicative of the at least one of the trained neural network or the one or more TL or FL beam weights to a same UE of the at least one UE.

15. The apparatus of claim 12, wherein to receive the information indicative of the one or more beam weights, the at least one processor is configured to receive the information indicative of the one or beam weights from a first UE of the at least one UE, and wherein to communicate the information indicative of the at least one of the trained neural network or the one or more TL or FL beam weights, the at least one processor is configured to communicate the information indicative of the at least one of the trained neural network or the one or more TL or FL beam weights to a second UE of the at least one UE that is different from the first UE.

16. The apparatus of claim 12, wherein the at least one blockage is further mapped to at least one of a hand property, a skin property, a design parameter of the UE, an antenna module property, an antenna array size, boresight direction information, a beam property, a type of substrate material, or radio frequency (RF) circuit-related information.

17. The apparatus of claim 12, wherein the hand orientation further corresponds to at least one of a loose hand grip, a firm hand grip, an intermediate hand grip, or an indication of a finger orientation of at least one finger relative to an antenna module of the at least one UE.

18. The apparatus of claim 12, wherein the received information corresponds to at least one of historical data indicative of the at least one blockage, a signal strength associated with the at least one blockage, or an application that is executing on the at least one UE at a time that the at least one blockage occurs.

19. The apparatus of claim 12, wherein the at least one processor is further configured to:
receive a request for at least one reference signal for a training procedure of the neural network stored at the at least one UE, the training procedure associated with the at least one blockage; and transmit the at least one reference signal based on the received request.

20. The apparatus of claim 12, wherein the at least one processor is further configured to store, in an ML database, the information indicative of the at least one of the trained neural network or the one or more TL or FL beam weights indicated via the trained neural network.

21. The apparatus of claim 20, wherein the ML database is located at the ML server.

22. The apparatus of claim 12, wherein the at least one processor is further configured to receive a request from the at least one UE for the information indicative of the at least one of the trained neural network or the one or more TL or FL beam weights, the request based on the at least one of the TL procedure or the FL procedure.

23. The apparatus of claim 12, further comprising a transceiver coupled to the at least one processor.

24. An apparatus for communication at a user equipment (UE), comprising:
- at least one memory; and
- at least one processor coupled to the at least one memory and configured to:
  - receive, from a machine learning (ML) server, information indicative of at least one of a trained neural network or one or more transfer learning (TL) or federated learning (FL) beam weights indicative of the trained neural network, wherein the information indicative of at least one of the trained neural network or the one or more TL or FL beam weights is associated with at least one blockage of a beam transmission, and wherein the at least one blockage is mapped to at least one of a first property of one or more first materials included in at least one UE, a second property of one or more second materials that cover the at least one UE, or a hand orientation corresponding to one of a left-hand grip or a right-hand grip, wherein a hand grip state space associated with one of the left-hand grip or the right-hand grip is quantized based on at least one quantization rule, and wherein the at least one quantization rule is agreed upon between the UE and a network; and
  - generate a signal based on the information indicative of the at least one of the trained neural network or the one or more TL or FL beam weights, the signal including the one or more TL or FL beam weights.

25. The apparatus of claim 24, wherein the at least one processor is further configured to initialize a neural network stored at the UE in association with the at least one blockage of the beam transmission based on the information indicative of the at least one of the trained neural network or the one or more TL or FL beam weights.

26. The apparatus of claim 24, wherein the at least one blockage is further mapped to at least one of a hand property, a skin property, a design parameter of the UE, an antenna module property, an antenna array size, boresight direction information, a beam property, a type of substrate material, or radio frequency (RF) circuit-related information.

27. The apparatus of claim 24, wherein the UE is a same UE as a TL or FL UE that communicates information to the ML server for training the neural network based on at least one of a TL procedure or an FL procedure.

28. The apparatus of claim 24, wherein the UE is a different UE from a TL or FL UE that communicates information to the ML server for training the neural network based on at least one of a TL procedure or an FL procedure.

29. The apparatus of claim 24, wherein the at least one processor is further configured to transmit, to the ML server, information indicative of one or more beam weights associated with the at least one blockage.

30. The apparatus of claim 24, further comprising a transceiver coupled to the at least one processor.

* * * * *